United States Patent
Tani et al.

(10) Patent No.: US 9,800,747 B2
(45) Date of Patent: Oct. 24, 2017

(54) OPERATION CONSOLE, IMAGE PROCESSING APPARATUS AND DISPLAY METHOD

(71) Applicant: Sharp Kabushiki Kaisha, Osaka (JP)

(72) Inventors: Takeshi Tani, Osaka (JP); Shinsaku Tohki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 61 days.

(21) Appl. No.: 14/574,948

(22) Filed: Dec. 18, 2014

(65) Prior Publication Data

US 2015/0103369 A1 Apr. 16, 2015

Related U.S. Application Data

(63) Continuation of application No. 13/212,552, filed on Aug. 18, 2011, now Pat. No. 8,928,900.

(30) Foreign Application Priority Data

Aug. 27, 2010 (JP) ................................. 2010-190418

(51) Int. Cl.
| | |
|---|---|
| H04N 1/00 | (2006.01) |
| G06F 3/12 | (2006.01) |
| G06F 3/14 | (2006.01) |
| G06K 15/02 | (2006.01) |

(52) U.S. Cl.
CPC ....... *H04N 1/00411* (2013.01); *H04N 1/0044* (2013.01); *H04N 1/00392* (2013.01); *H04N 1/00477* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,590,584 | B1 * | 7/2003 | Yamaura | G06F 3/0481 715/704 |
| 6,714,314 | B1 * | 3/2004 | Ueda | G07F 17/26 358/1.1 |
| 7,164,486 | B1 * | 1/2007 | Nakamura | G03G 15/36 358/1.1 |
| 2001/0013954 | A1 * | 8/2001 | Nagai | H04N 1/00427 358/444 |
| 2001/0026290 | A1 | 10/2001 | Machida et al. | |

(Continued)

FOREIGN PATENT DOCUMENTS

| | | |
|---|---|---|
| JP | 2001-273068 | 10/2001 |
| JP | 2003-131528 | 5/2003 |

(Continued)

*Primary Examiner* — Beniyam Menberu

(74) *Attorney, Agent, or Firm* — Keating & Bennett, LLP

(57) ABSTRACT

In order to provide an operation console having superior operability and visibility, a touch-panel display includes a display panel displaying a copy mode basic screen image with virtual keys, and a touch-panel receiving an input operation to the virtual keys. On the copy mode basic screen image, a group of virtual ten keys for inputting the number of copies are displayed. When image data is input by a document reading unit, the touch-panel display causes a preview image based on the image data to be displayed with higher priority than the group of virtual ten keys, in the copy mode basic screen image.

10 Claims, 21 Drawing Sheets

(56) References Cited

U.S. PATENT DOCUMENTS

| | | | |
|---|---|---|---|
| 2003/0215256 A1* | 11/2003 | Osada | 399/81 |
| 2007/0070442 A1* | 3/2007 | Ohkubo | H04N 1/00442 358/451 |
| 2007/0165248 A1 | 7/2007 | Utsunomiya et al. | |
| 2008/0136837 A1* | 6/2008 | Iguchi | G06F 3/14 345/619 |
| 2008/0231914 A1* | 9/2008 | Motoyoshi | 358/474 |
| 2008/0252601 A1 | 10/2008 | Boys | |
| 2008/0320406 A1* | 12/2008 | Fukada et al. | 715/766 |
| 2009/0066644 A1* | 3/2009 | Endoh | G03G 15/502 345/157 |
| 2009/0265625 A1* | 10/2009 | Tamai et al. | 715/274 |
| 2010/0107064 A1 | 4/2010 | Yamaguchi et al. | |
| 2010/0110513 A1 | 5/2010 | Fujita et al. | |
| 2010/0149590 A1 | 6/2010 | Nishiyama et al. | |
| 2011/0234518 A1* | 9/2011 | Maruyama | G06F 3/0481 345/173 |

FOREIGN PATENT DOCUMENTS

| | | |
|---|---|---|
| JP | 2008-203439 | 9/2008 |
| JP | 2008-293148 | 12/2008 |
| JP | 2009-177526 | 8/2009 |
| JP | 2010-147569 | 7/2010 |

\* cited by examiner

OPERATION CONSOLE, IMAGE PROCESSING APPARATUS AND DISPLAY METHOD

CROSS-REFERENCE TO RELATED APPLICATION

This nonprovisional application is a continuation of U.S. Ser. No. 13/212,552, filed on Aug. 18, 2011, which claims priority under 35 U.S.C. §119(a) to Patent Application No. 2010-190418 filed in Japan on Aug. 27, 2010, the entire contents of which are hereby incorporated by reference.

BACKGROUND OF THE INVENTION

Field of the Invention

The present invention relates to an operation console having a touch-panel display and, more specifically, to a technique facilitating user input and image confirmation.

Description of the Background Art

A technique of displaying software keys on a screen image of a touch-panel display, allowing a user to operate the software keys has been known.

By way of example, Japanese Patent Laying-Open No. 2009-177526 (hereinafter referred to as '526 Reference) discloses an image processing apparatus in which, when a user selects a simple-operation mode by a mode selection key, an operation screen image including various software keys used for operation in the simple-operation mode is displayed. The various software keys include a start key, a setting key and ten keys. Japanese Patent Laying-Open No. 2003-131528 (hereinafter referred to as '528 Reference) discloses an image forming apparatus detecting user behavior and changing arrangement of UI components displayed on a display operation unit. The UI components of which arrangement is changed in '528 Reference include a display unit, ten keys and a start key.

Further, conventionally, a technique of displaying a preview image on a screen of a display device, allowing a user to confirm a finished state of the image and giving an instruction for image processing has been known.

By way of example, Japanese Patent Laying-Open No. 2008-203439 (hereinafter referred to as '439 Reference) discloses an image processing apparatus in which a preview image satisfying prescribed conditions among a plurality of preview images is displayed with emphasis.

In the apparatuses related to images as described above, numerical values such as the number of copies are often input as parameters for setting operations of the apparatuses. Ten keys are used for inputting the numerical values. In an apparatus using a touch-panel display, the ten keys are also displayed as virtual keys on the touch-panel display. Since the ten keys are used with high frequency, it is desirable that the ten keys are displayed constantly.

On the other hand, image previews are displayed also with high frequency. For displaying a preview image, display area as large as possible is desired. If the ten keys are displayed on the screen image, however, the usable area becomes undesirably smaller.

In view of the foregoing, it may be helpful to make some operation to switch the display of ten keys on and off. The method of display switching, however, may have room for improvement. It is particularly desirable, when the preview image is to be displayed, to provide the preview display as smooth as possible and to allow immediate change of settings using ten keys when necessary. Further, it may be comfortable for the user if he/she can confirm the preview image as an object during the setting.

The techniques disclosed in '526, '528 and '439 References are silent about the problem related to the display switching between preview images and ten keys. Therefore, according to the techniques disclosed in these References, it is often the case that the user, who is to confirm the preview image and to make an operation using the virtual ten keys, has to erase the ten keys, as the ten keys are displayed even if setting change is unnecessary, when a preview image is displayed. Further, when the user wishes to change settings and has the ten keys displayed, he/she may feel uncertain on which preview image the process is being done. Specifically, there is a trade-off between operability and visibility when the user is to confirm the preview image and when the user is to change settings using the ten keys, and it has been difficult to solve this trade-off by the conventional techniques described above.

SUMMARY OF THE INVENTION

Therefore, it is preferable to provide an operation console that can solve the operability-visibility trade-off and has both superior operability and superior visibility.

It is further preferable to provide an operation console that allows easy confirmation of a preview image and easy change of setting at the time of output of the preview image, and allows the user to clearly understand on which preview image the setting is being changed at the time of setting change.

If possible, it is preferred that the display can be returned from setting change to preview image display with a simple and intuitive operation.

According to a first aspect, the present invention provides an operation console provided on an image processing apparatus including an image input device for inputting image data, and an output device for outputting the image data input by the image input device. The operation console includes: a display device having a display area for displaying a virtual key; and a first input receiving device receiving an input operation to the virtual key. The virtual key includes ten keys for inputting a set value related to an output by the output device. The operation console further includes a first display control device displaying, when the image data is input by the image input device, an image based on the image data on the display device with higher priority than the ten keys.

In the display area, the ten keys for inputting a setting value related to an output by the output device are displayed. Therefore, it is possible for the user to input through the ten keys, without requesting display of the ten keys. When the image data is input, an image based on the image data is displayed with higher priority than the ten keys, on the display device. Therefore, it is unnecessary for the user to erase the ten keys to confirm the input image. As a result, an operation console usually having high operability of ten keys and having superior visibility for the user of the image when the image data is input, can be provided.

Preferably, the operation console further includes: a request key display device displaying, when the image data is input by the input device, a request key for requesting display of the ten keys with higher priority than the image on the display area of the display device, in place of the ten keys. On the one hand, when the image data is input, display of the image is given higher priority than the ten keys. Therefore, the user can easily confirm the contents of the image. On the other hand, when the request key is operated, the ten keys are displayed with higher priority than the image. Therefore, when a setting value related to output is to be input, the user can operate the request key to have the ten keys displayed with higher priority than the image, to perform desired input. Thus, user operability can be improved.

More preferably, the display device further includes a setting value display area for displaying a set value related to the output by the output device. The request key display device displays the request key close to the setting value display area. Since the request key is displayed close to the setting value display area, the relation between the two can easily be understood. Further, when the user wants to input a setting value related to output, the user can easily found the request key by looking the vicinity of the display area where the setting value is displayed. Thus, user operability can further be improved.

More preferably, the operation console further includes an instruction receiving device receiving an instruction requesting display of the ten keys with higher priority than the image; and a second display control device, responsive to the instruction receiving device receiving the instruction, for causing the display device to display the ten keys superposed in front of the image with at least a part of the image displayed viewable. Even when the ten keys are displayed in front of the image, the user can confirm part of the contents of the image. Therefore, it is possible for the user to input a setting value while he/she is aware on which image the output is set. Thus, the user can make setting related to the image with ease and without confusion.

More preferably, the ten keys are transparent images. Therefore, even when the ten keys are displayed in front of the image, it is possible for the user to easily confirm the contents of the image. As a result, it is possible to input the setting value while the user is aware on which image the output is set.

More preferably, the oration console further includes a second input receiving device receiving an input operation on the image displayed on said display screen; and a request key display device, responsive to the second input receiving device receiving the input operation, for causing the display device to display a request key requesting display of the ten keys with higher priority than the image, in place of the ten keys.

At least a part of the image is constantly displayed in the display area. The user can make an operation on the image at any time. The user can end the ten key display whenever an operation is made on the image, when the user wants to confirm contents of the image. As a result, it is possible for the user to easily confirm the contents of the image. Further, when the user wishes to input a setting value related to output, the user can display the ten keys with higher priority than the image by making an operation on the request key. Thus, user operability can be improved.

More preferably, the operation console further includes a request key display device causing the display device to display a request key requesting display of the ten keys with higher priority than the image, in place of the ten keys, when a predetermined, prescribed time passes without any input operation on the ten keys. Therefore, if the user does not want to input any setting value related to output, the display of ten keys is automatically terminated. Therefore, it is easier for the user to confirm the contents of the image. If an operation of ten keys becomes necessary, the user may operate the request key and the ten keys are displayed again and can be operated. Thus, user operability can be improved.

More preferably, a start key for requesting output by the output device is always displayed as the virtual key on the display area. Therefore, regardless of the state of display of the display device, the user can immediately execute output of an image from the output device, by operating the start key. Thus, user operability can be improved.

More preferably, the operation console further includes a start instruction receiving device receiving an input operation to the start key; and a returning device, responsive to the start instruction receiving device receiving the operation, for returning display state of the display device to a state before the input data is input by the input device.

Because of the function of returning device, at the end of image data output, the ten keys are displayed on the display area. Thus, it is possible for the user to perform normal operation on the ten keys without requesting display of the ten keys, when the image data is not input (hereinafter referred to as "input standby state"). As a result, user operability can be improved.

According to a second aspect, the present invention provides an image processing apparatus including any of the above-described operation consoles, the image input device for inputting image data, and the output device for outputting the input image data. Since the image processing apparatus is provided with the operation console having superior operability and superior visibility as described above, output errors and the like resulting from erroneous operation by the user can be reduced. Thus, an image processing apparatus highly convenient for the user can be provided.

According to a third aspect, the present invention provides a method of display in an operation console provided on an image processing apparatus including an image input device for inputting image data, an output device for outputting the image data input by the image input device, and the operation console. The operation console includes a display device having a display area for displaying a virtual key and an input receiving device receiving an input operation to the virtual key. The display method includes the steps of; displaying, as the virtual key, ten keys for inputting a set value related to an output by the output device, on the display area; and displaying, when image data is input by the image input device, an image based on the image data with higher priority than the ten keys, on the display device.

In the absence of image data input, ten keys for inputting a setting value related to the output by the output device are displayed on the display area. Thus, it is possible for the user to perform normal operation on the ten keys without requesting display of the ten keys. As a result, user operability can be improved.

When the image data is input, the image based on the image data is displayed on the display device with higher priority than the ten keys. Therefore, when the image data is input, the user can easily confirm the contents of the image, and hence, an operation console having superior visibility to the user can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
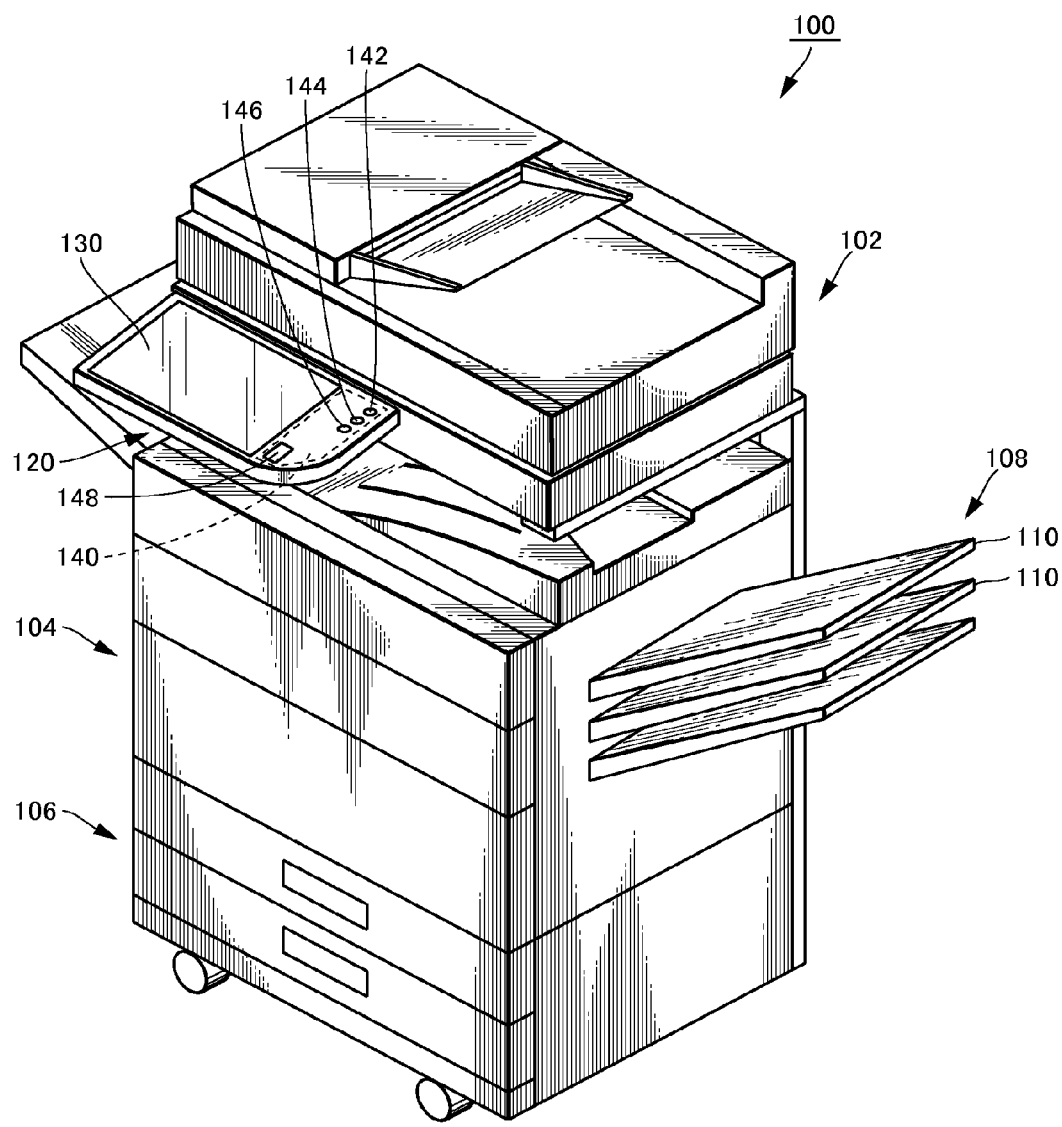
FIG. 1 shows an appearance of an image forming apparatus in accordance with an embodiment of the present invention.

In the following description, the same components are denoted by the same reference characters. Their names and functions are also the same. Therefore, detailed description thereof will not be repeated.

[Image Forming Apparatus 100]

Figure 2:
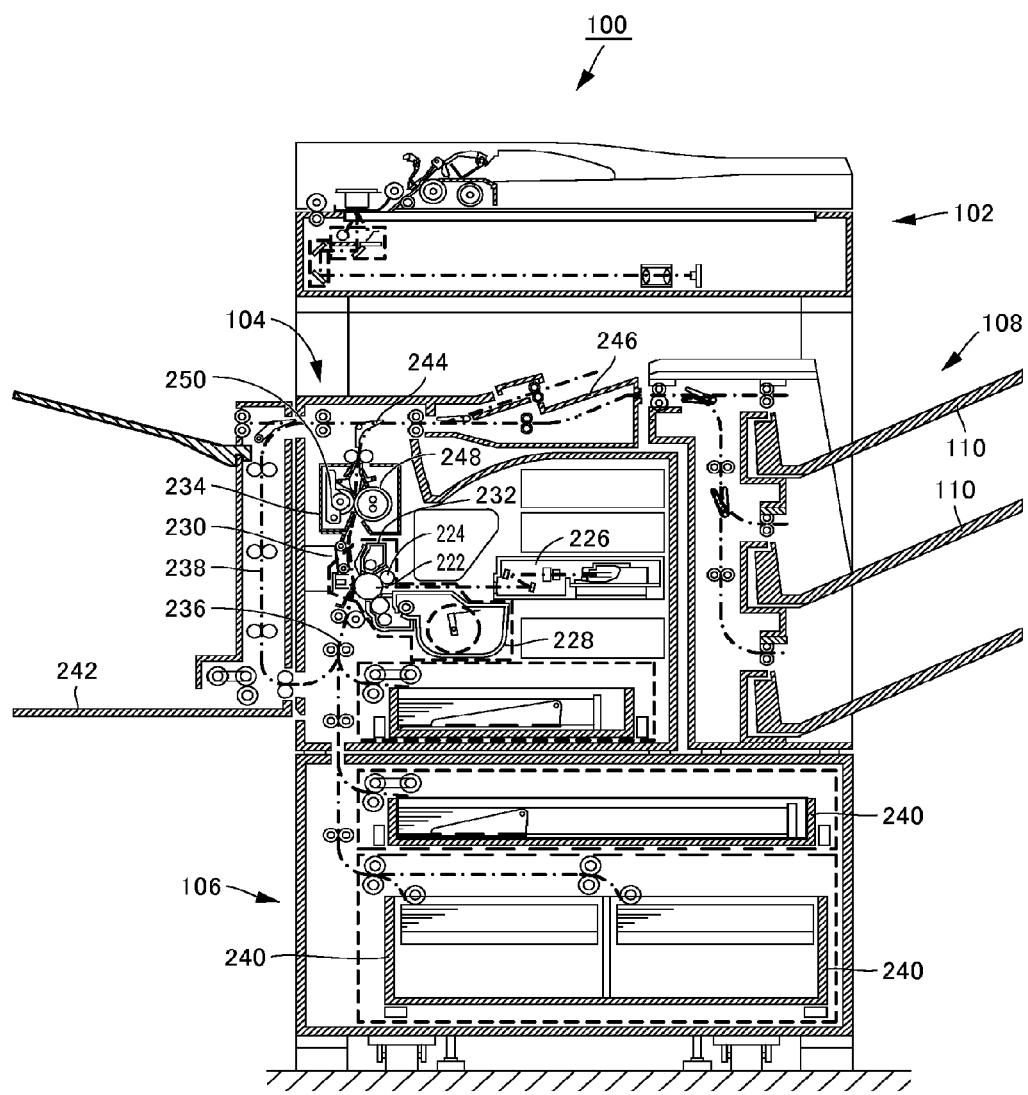
FIG. 2 schematically shows an internal configuration of the image forming apparatus shown in FIG. 1.
Figure 3:
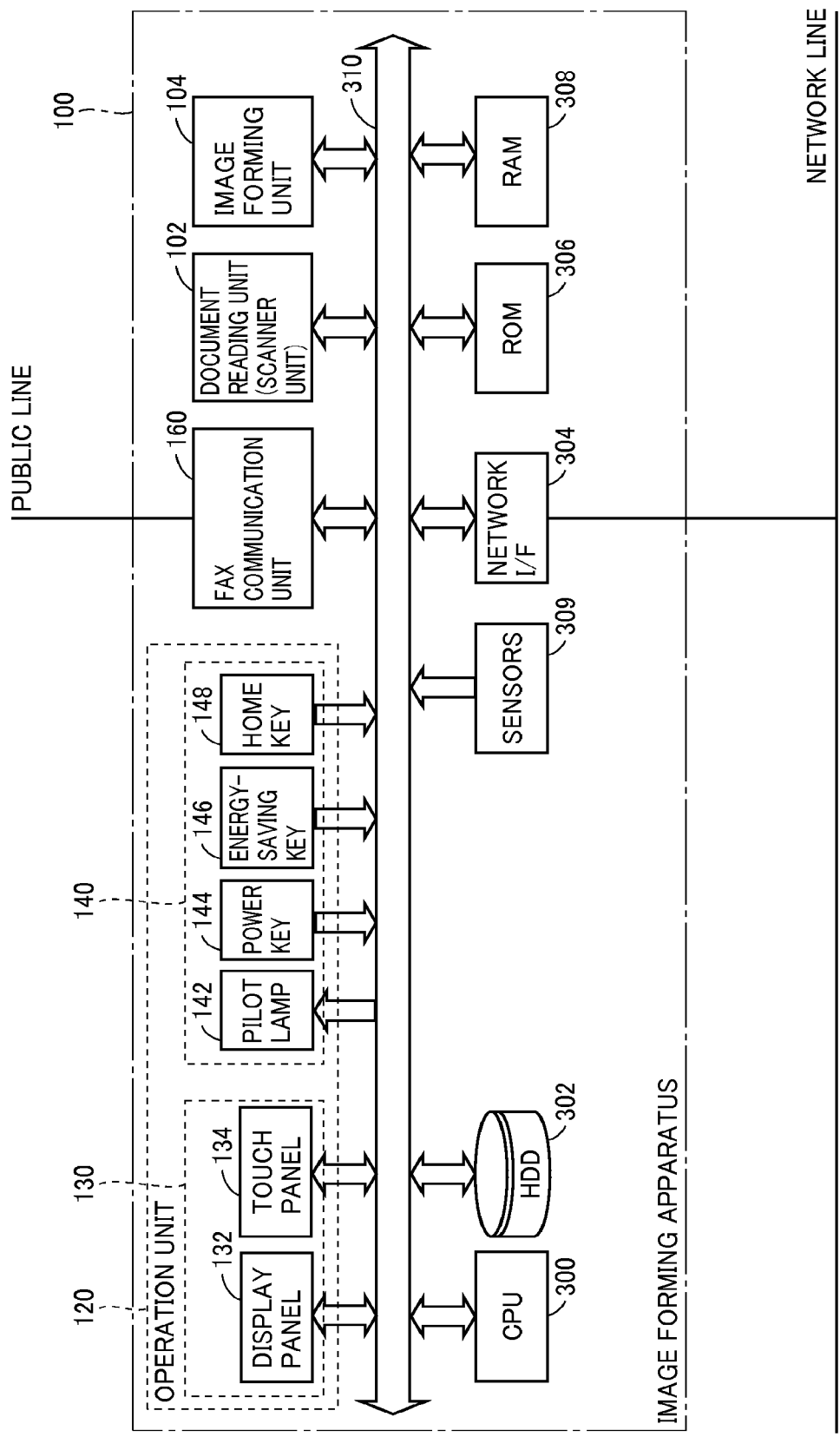
FIG. 3 is a block diagram of the image forming apparatus shown in FIG. 1.

Referring to FIGS. 1 to 3, an image forming apparatus 100 in accordance with an embodiment of the present invention is a Multifunction Printer (MFP) having scanner function, copy function, facsimile (hereinafter denoted as FAX) function and the like. When the user sets any of the operational modes such as the copy mode and the FAX mode, image forming apparatus 100 executes processes corresponding to the set operational mode.

<Hardware Configuration>

[Operation Unit 120 of Image Forming Apparatus 100]

Referring to FIGS. 1 and 3, image forming apparatus 100 includes an operation unit 120. Operation unit 120 is formed of an operation panel provided with an upper surface inclined to be lower on the front side than the deeper side, to be easily viewable by the user on an upper front side of image forming apparatus 100. Operation unit 120 includes a touch-panel display 130 arranged from the center to the left side on the surface of operation unit 120 and a display operation unit 140 arranged on the right side on the surface of operation unit 120. Touch-panel display 130 and display operation unit 140 are held in one housing. Operation unit 120 communicates with a CPU 300, which will be described later, through an input/output interface (not shown).

Touch-panel display 130 includes a display panel 132 and a touch-panel 134 stacked on display panel 132. On display panel 132, a home screen image (not shown), and basic screen images of various operational modes are displayed. The home screen image is an image allowing selection of a desired operational mode from a plurality of operational modes executable by image forming apparatus 100. By way of example, on the home screen image, an icon as a software key for selecting the copy mode and an icon as a software key for selecting the FAX mode are displayed. The basic screen image is an image allowing setting of various functions and parameters in various operational modes. Display panel 132 is controlled by a CPU 300. On the screen image of display panel 132, software keys are displayed. When the user presses any of the software keys with his/her finger, touch-panel 134 detects the pressed position and outputs a coordinate signal. CPU 300 compares the display position of the software key and the coordinates from the touch-panel on a program, and based on the result of comparison, determines which of the keys has been operated. Further, in accordance with the pressed key, CPU 300 selects an operational mode, sets various functions and parameters, and gives an operation instruction. Though the size and shape of touch-panel display 130 are not specifically limited, one having a rectangular shape of 1024 pixels×600 pixels of landscape orientation may be used.

Display operation unit 140 includes a pilot lamp 142 and various hardware keys such as a power key 144, an energy saving key 146 and a home key 148. Pilot lamp 142 includes, for example, an LED (Light Emitting Diode), and it is turned on or off or flickered by the control of CPU 300. Pilot lamp 142 is normally off, and it flickers in association with mode transition when, for example, transition from a normal mode to a power saving mode takes place. The normal mode refers to a state in which main power is on and all operational modes are executable. The energy saving mode refers to a state in which the main power is on and only some limited operational modes are executable. Since electric power is not supplied to units that are used only in the non-executable operational modes, energy consumption can be saved.

Power key 144 gives an instruction to make a transition from the energy saving mode or the like to the normal mode. It is noted that power key 144 does not control the main power supply of image forming apparatus 100. The main power is turned on/off by a main power switch (not shown) separate from power key 144.

Energy saving key 146 toggles between the normal mode and the energy saving mode. The image forming apparatus enters the energy saving mode when energy saving key 146 is pressed and when a predetermined, prescribed time period passes without any operation by the user.

Home key 148 gives an instruction to make a transition to the home screen image (not shown). When the user presses home key 148, the home screen image is displayed on display panel 132.

If the user operates any of the above-described icons displayed on the home screen image, any of operational modes including the copy mode, FAX mode and the like is selected. On display panel 132, a basic screen image of the selected operational mode is displayed as the initial screen image. The user operation by the user for operating an icon includes, for example, a touch operation (input operation based on the position of pressing by the user) and a gesture operation (input operation based on the trajectory of operation by the user). These examples are not limiting, and any operation generally used in the field of art may be used.

Figure 4:
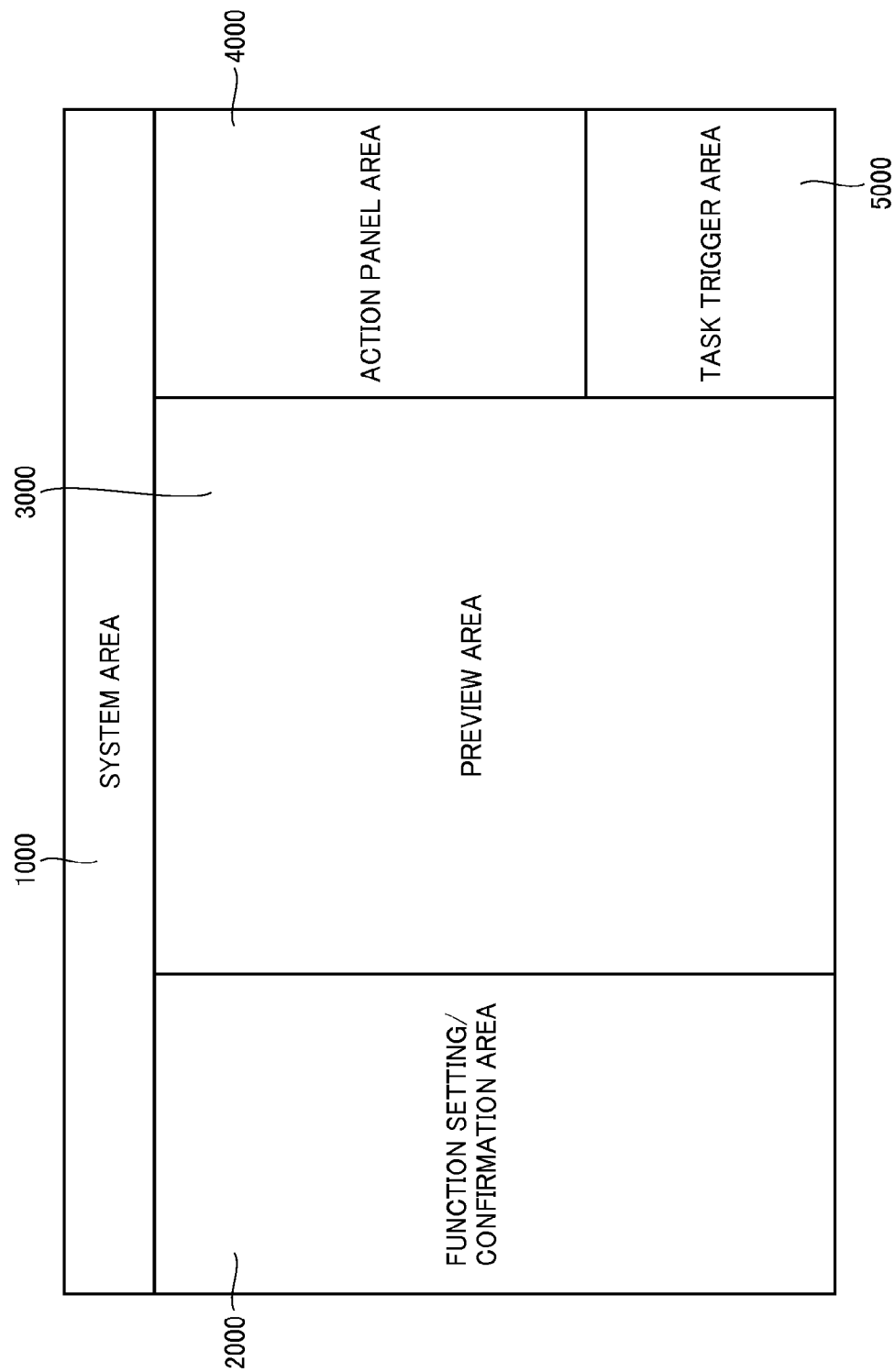
FIG. 4 shows a basic layout configuration of a basic screen image of various operational modes.

Referring to FIG. 4, the basic screen image of each operational mode includes a system area 1000, a function setting/confirmation area (hereinafter referred to as "function selecting area") 2000, a preview area 3000, an action panel area 4000 and a task trigger area 5000. These five areas are arranged in the following manner, in accordance with a basic layout. Specifically, system area 1000 is arranged at the top of the screen image. Preview area 3000 is arranged at the center of the screen image. Function selecting area 2000 is arranged on the left side of area 3000. Action panel area 4000 is arranged on the upper right side of area 3000. Task trigger area 5000 is arranged on the lower right side of area 3000. The five areas forming the basic screen image of each operational mode and the basic layout are common in all operational modes.

As examples of the basic screen images of various operational modes, the basic screen image for the copy mode and the basic screen image for the FAX mode will be described in the following. These images are displayed as initial screen images when the copy mode and the FAX mode are selected, respectively.

[Copy Mode Basic Screen Image 7100]

Figure 5:
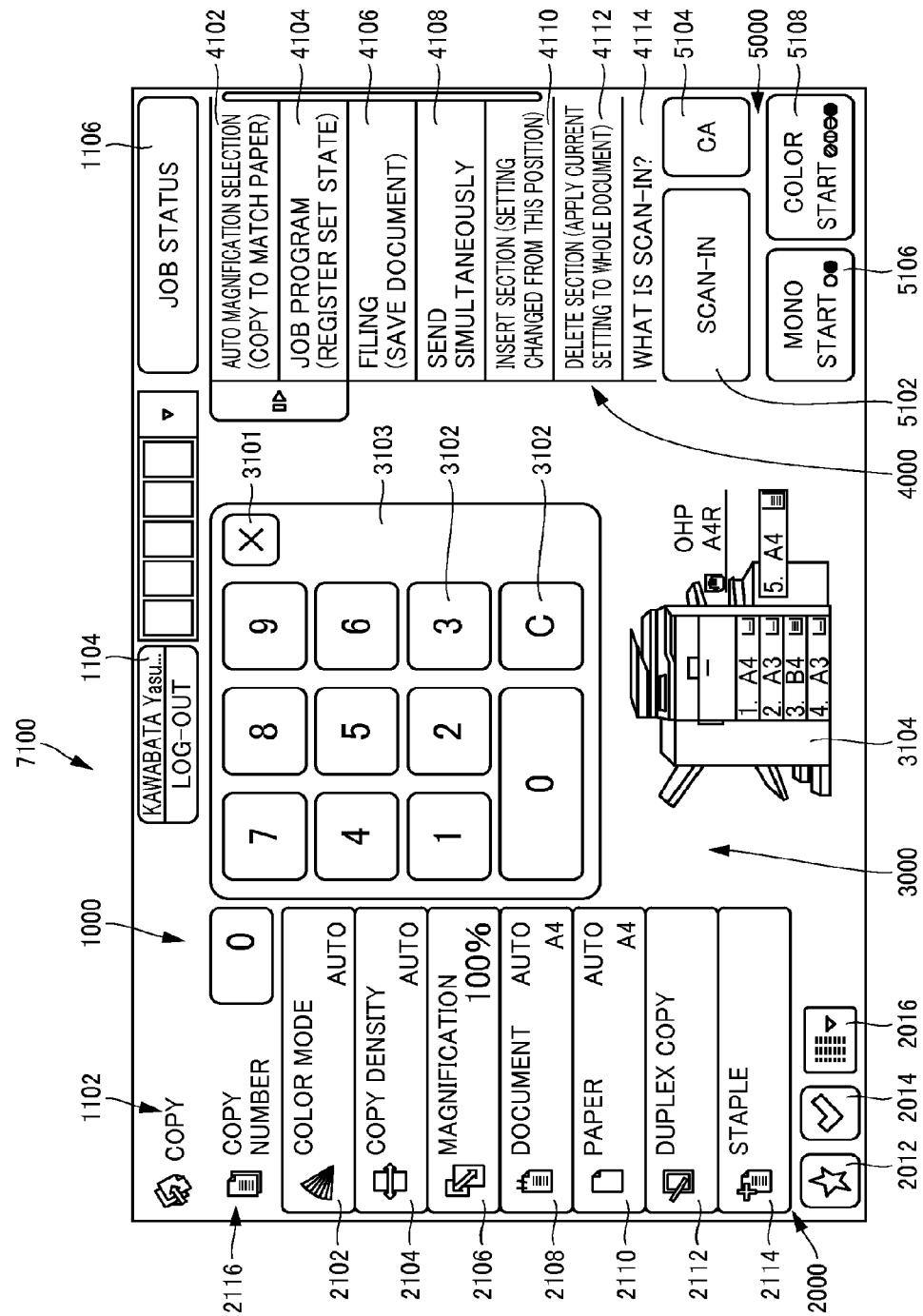
FIG. 5 shows an example of a copy mode basic screen image as an initial screen image.

Referring to FIG. 5, on system area 1000 of copy mode basic screen image 7100, a character sequence "COPY" 1102 indicating the copy mode, a log-out key 1104 for executing log-out and the like are displayed. On log-out key 1104, a logged-in user name is displayed. In system area 1000, an area 1106 indicating the current job status is provided and, by way of example, an icon indicating that the copy process is currently being executed and an icon indicating that the process is currently suspended (both not shown) are displayed in this area 1106.

On function selecting area 2000 of screen image 7100, various setting keys for changing various functions and conditions such as parameters related to the copy mode are displayed. In the present embodiment, a key 2102 for switching color mode, a key 2104 for changing copy density, a key 2106 for changing copy magnification, a key 2108 for changing document size, a key 2110 for changing size of recording paper to be used, a key 2112 for setting duplex copy function, and a key for setting stapling function are displayed as various setting keys. If the user touches any of the keys 2102 to 2114, a setting screen image (for example, density setting screen image, magnification setting screen image, document setting screen image or the like) corresponding to the pressed key is displayed on display panel 132.

Above the various setting keys 2102 to 2114 in area 2000, an area 2116 is provided for displaying the number of copies input by the user. In area 2116, character sequence "copy number" and a numerical value indicating the number of copies are displayed. In the present embodiment, it is possible to input up to 4-digit number as the numerical value indicating the number of copies, and in the initial state, "0" is displayed. Below the above-described various setting keys 2102 to 2114 in area 2000, change keys 2012 to 2016 for changing display style of various setting keys 2102 to 2114 are displayed. Change key 2012 causes only the setting keys related to the functions registered in advance as "favorites" to be displayed. Change key 2014 causes only the setting keys related to the function or functions of which setting has been changed to be displayed. Change key 2016 causes setting keys related to all functions of which setting can be changed in the corresponding operational mode to be displayed. In the following description, it is assumed that change key 2016 has been selected and setting keys related to all functions of which setting can be changed in the copy mode are displayed on area 2000.

If not all setting keys to be displayed can be displayed in area 2000, various setting keys are displayed in upward/downward scrollable manner. Here, the display positions of change keys 2012 and 2016 are fixed. The user may switch the display portion of various setting keys upward/downward by a touch operation (scroll operation) or a gesture operation (flick operation in upward/downward direction).

On preview area 3000 of screen image 7100, a group of virtual ten keys 3102 is displayed, for inputting, for example, the number of copies. The group of virtual ten keys 3102 includes numeric keys of 0 to 9 and a clear (C) key. The group of virtual ten keys 3102 is always displayed on the background area 3103 as a window. In the present embodiment, background area 3103 is non-transparent. The user can close the background area 3103 by touching a "close" key 3101 displayed in background area 3103. When background area 3103 is closed, the group of virtual ten keys 3102 is also erased. Therefore, in the present specification, closing of background area 3103 may be also referred to as end of display of virtual ten keys 3102. Below the group of virtual ten keys 3102, a mimic image 3104 showing the current status of image forming apparatus 100 is displayed. It is possible for the user to display a paper setting screen image on display panel 132 by touching mimic image 3104.

On action panel area 4000 of screen image 7100, various execution keys for executing recommended functions in the copy mode are displayed. The recommended functions refer to functions selected in the past in combination with the function selected by the user. In the present embodiment, as the various execution keys, a key 4102 for automatically selecting copy magnification in accordance with the recording paper to be used, a key 4104 for registering currently set conditions (job program), a key 4106 for executing image data filing, a key 4108 for transmitting image data simultaneously with a copy process, a key 4110 for inserting a section, a key 4112 for deleting a section, and a key 4114 for displaying a screen image showing contents of a scan-in process are displayed.

On task trigger area 5000 of screen image 7100, a scan-in key 5102, a clear-all key 5104, a monochrome start key 5106 and a color start key 5108 are displayed. Scan-in key 5102 is for starting execution of a scan-in process. In the scan-in process, in image forming apparatus 100, a document is scanned and a preview image based on the obtained scan data is displayed on preview area 3000. Clear-all key 5104 cancels all functions and parameters of which settings have been changed, and returns the settings to the default state. Monochrome start key 5106 is for starting a monochrome copy process in which a document is scanned and a monochrome copy is taken based on the obtained image data (or on scan data obtained by the scan-in process). Color start key 5108 is for starting a color copy process in which a document is scanned and a color copy is taken based on the obtained image data (or on scan data obtained by the scan-in process). As described above, in the present specification, the image data scanned by the scan-in process is referred to as "scan data" and distinguished from other image data.

[FAX Mode Basic Screen Image 7300]

Figure 6:
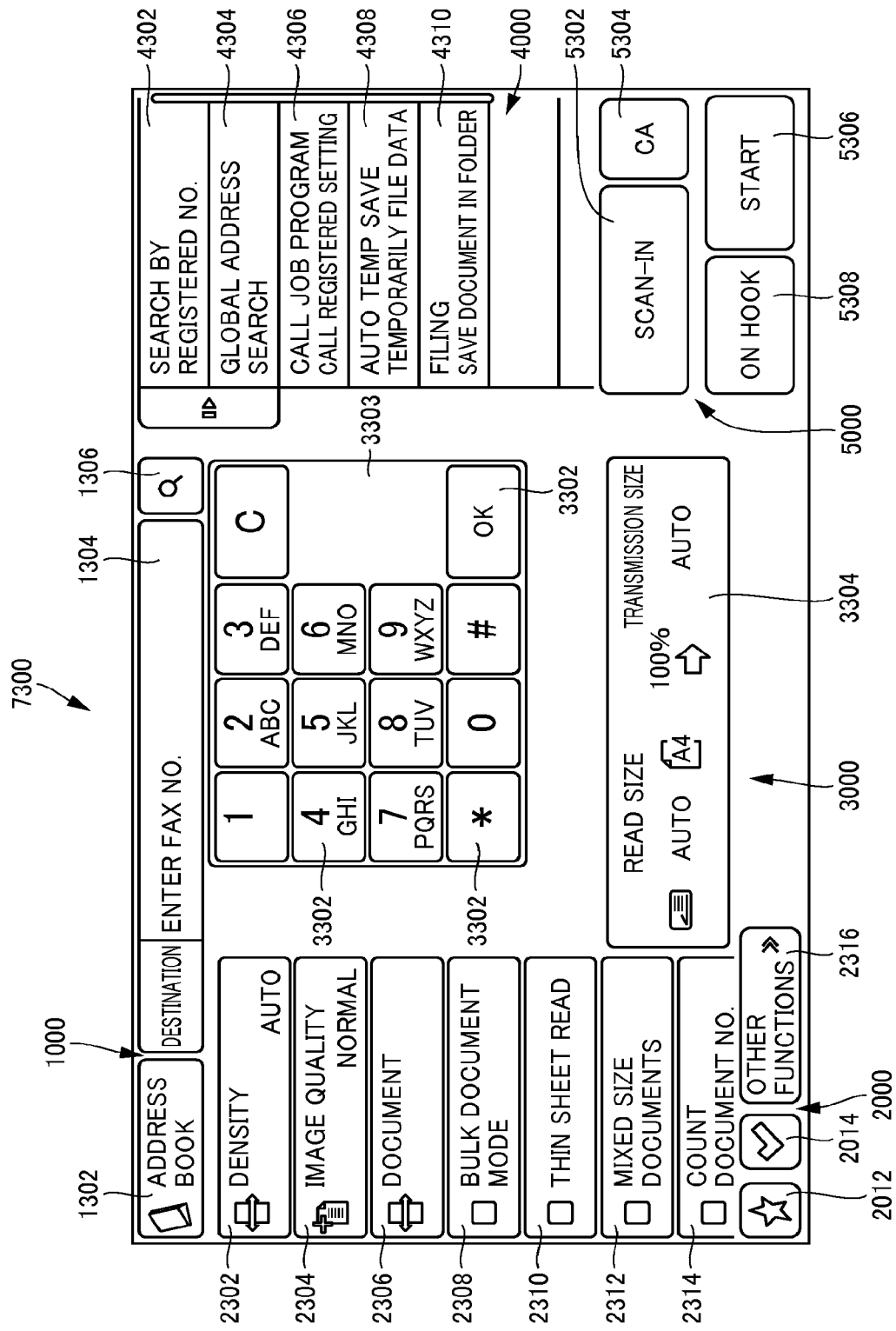
FIG. 6 shows an example of a FAX mode basic screen image as the initial screen image.

Referring to FIG. 6, on system area 1000 of FAX mode basic screen image 7300, a key 1302 for requesting display of an address book, a number display area 1304 for displaying an input FAX number of a transmission destination, a search icon 1306 for requesting display of a search screen image for designating a transmission destination are displayed. For prescribed FAX numbers, search numbers are registered in advance. By designating a search number, a desired transmission destination can be designated.

On area 2000 of FAX mode basic screen image 7300, various setting keys for changing settings of various functions and conditions such as parameters related to the FAX mode are displayed. In the present embodiment, as the various setting keys, a key 2302 for changing the density of FAX document, a key 2304 for changing image quality of FAX document, a key 2306 for changing transmission size or the like of FAX document, a key 2308 for setting a bulk document mode, a key 2310 for setting a thin-paper reading function, a key 2312 for setting a mixed-size document processing function, and a key 2314 for setting a document number counting function are displayed. If any of the keys 2302 to 2306 is touched by the user, a setting screen image corresponding to the touched key is displayed on display panel 132. These setting screen images include, by way of example, a density setting screen image, an image quality setting screen image, and a document setting screen image. On keys 2308 to 2314, check boxes are displayed. If any of the keys 2308 to 2314 is touched, the check box of the touched key is checked, and the function corresponding to the touched key is set. Below the above-described various setting keys 2302 to 2314 on area 2000, change keys 2012 and 2014 as mentioned above, and a key 2316 for requesting display of a screen image showing a list of special functions different from the functions displayed on area 2000 are displayed. In the following description, it is assumed that change key 2012 has been selected, and only the setting keys related to the functions registered as "favorites" in the FAX mode are displayed on area 2000.

If not all setting keys to be displayed can be displayed in area 2000, various setting keys are displayed in upward/downward scrollable manner. Here, the display positions of change keys 2012 to 2316 are fixed. The user may switch the display portion of various setting keys upward/downward by a touch operation (scroll operation) or a gesture operation (flick operation in upward/downward direction).

On preview area 3000 of FAX mode basic screen image 7300, a group of virtual ten keys 3302 for inputting a FAX number or the like is displayed. The group of virtual ten keys 3302 includes numeric keys of 0 to 9, symbol keys such as "#", a clear (C) key, and an OK key. The group of virtual ten keys 3302 is always displayed on a background area 3303 as a window. In the present embodiment, background area 3303 is non-transparent. It is noted that in background area 3303, the "close" key for closing background area 3303 is not displayed.

On area 3000, an icon indicating whether or not a FAX document is placed on a platen or on an automatic document feeder (ADF) (both not shown), and a window 3304 indicating current status of fax transmission setting are displayed.

On action panel area 4000 of FAX mode basic screen image 7300, various execution keys for executing recommended functions in the FAX mode are displayed. In the present embodiment, as the various setting keys, a key 4302 for searching a desired FAX number by a registered number, a key 4304 for executing a global address search, a key 4306 for executing a call of a set condition (job program) registered in advance, a key 4308 for executing temporary automatic saving of image data, and a key 4310 for executing image data filing are displayed.

On task trigger area 5000 of FAX mode basic screen image 7300, a scan-in key 5302, a clear all key 5304, a start key 5306 and an on-hook key 5308 are displayed. Scan-in key 5302 is for starting the scan-in process. In the scan-in process, image forming apparatus 100 scans the FAX document, and a preview image based on the obtained scan data is displayed on preview area 3000. Clear-all key 5104 cancels all functions and parameters of which settings have been changed, and returns the settings to the default state. Start key 5306 is for starting the FAX transmission process. On-hook key 5308 is to set the line to the on-hook state.

[Overall Configuration of Image Forming Apparatus 100]

Referring to FIGS. 1 to 3, image forming apparatus 100 includes, in addition to operation unit 120 described above, a document reading unit 102, an image forming unit 104, a paper feed unit 106, and a paper discharge unit 108. In the following, operations in the copy mode and the FAX mode will be described, to illustrate the overall hardware configuration of image forming apparatus 100.

—Copy Mode—

In the present embodiment, in the copy mode, document reading unit 102 and image forming unit 104 mainly operate to execute any of the mono-copy process, color copy process and scan-in process. The scan-in process will be described later.

(Normal Monochrome Copy Process and Color Copy Process)

When the copy mode is selected on the home screen image (not shown) and a monochrome start key 5106 or a color start key 5108 is touched while the scan-in process described above is not being done, a document placed manually or by an ADF on a platen is read as image data by document reading unit 102. The read image data is input to CPU 300 implemented, for example, by a microcomputer, shown in FIG. 3, and subjected to various image processing operations. Then, the image data is output to image forming unit 104.

Image forming unit 104 is for printing an image of the document based on the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided. Paper feed unit 106 draws out sheets of recording paper stacked on a paper feed cassette 240 or on a manual feed tray 242 one by one, and feeds the sheet of paper to main feeding path 236 of image forming unit 104. The sheet of recording paper fed from paper feed unit 106 is fed along main feeding path 236.

While the sheet of recording paper is fed along main feeding path 236, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222. When the monochrome copy process is executed, developer 228 supplies monochrome toner. When the color copy process is executed, developer 228 supplies color toner including yellow (Y), magenta (M), cyan (C) and black (K).

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater provided in heating roller 248 is heated by electric power supplied to fixing device 234 and controlled such that temperature of heating roller 248 attains to an appropriate temperature for fixing.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

(Monochrome Copy Process and Color Copy Process after Scan-in Process)

When the copy mode is selected on the home screen image (not shown), the scan-in process described above is done and thereafter, monochrome start key 5106 or a color start key 5108 may be touched. In such a case, scanning of the document image and the image processing on the image data described above do not take place, and image forming unit 104 performs the image forming process in the similar manner as described above on the scan data that has been read in the scan-in process and stored temporarily in the storage device.

—FAX Mode—

In the present embodiment, in the FAX mode, the scan-in process and the FAX transmission process are executed by the operations of document reading unit 102 and FAX communication unit 160 shown in FIG. 3. Further, the FAX communication process is executed by the operation of FAX communication unit 160. Further, the FAX reception process is executed by the operations of FAX communication unit 160 and image forming unit 104. The scan-in process will be described later.

(Normal FAX Transmission Process)

When the FAX mode is selected on the home screen image (not shown) and a start key 5306 described above is touched while the scan-in process is not being done, a document placed manually or by an ADF on a platen is read as image data by document reading unit 102. The read image data is input to CPU 300, and subjected to various image processing operations. Then, the image data is output to FAX communication unit 160.

(FAX Transmission Process after Scan-in Process)

On the other hand, when the FAX mode is selected on the home screen image (not shown), the scan-in process as will be described later is done and thereafter, the start key (not shown) may be touched. In such a case, scanning of the document image and the image processing on the image data described above do not take place, and the scan data that has been read in the scan-in process and temporarily stored in the storage device is output to FAX communication unit 160.

FAX communication unit 160 of image forming apparatus 100 on the transmitting side connects a transmitting side line to a designated transmission destination, converts the input image data or scan data to communication data in compliance with facsimile transmission standard, and transmits the converted data to a facsimile machine (such as an image forming apparatus 100 having the facsimile function) on the receiving side.

(FAX Communication Process)

When the line is connected, a FAX communication unit 160 of image forming apparatus 100 on the receiving side detects a communication request signal from FAX communication unit 160 of image forming apparatus 100 on the transmitting side, and transmits an acknowledgement signal. Thereafter, by way of example, FAX communication units 160 on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to FAX communication unit 160 of image forming apparatus 100 on the receiving side. When transmission ends, the line is disconnected.

(FAX Reception Process)

FAX communication unit 160 of image forming apparatus 100 on the receiving side converts the received data to image data and passes the data to an image forming unit 104. The received data may be converted to image data at the image forming unit 104. The image forming unit 104 prints an image of a document based on the image data converted from the received data on a sheet of recording paper, in a manner similar to the operation in the copy mode described above.

<Electrical Configuration>

Referring to FIG. 3, image forming apparatus 100 includes: operation unit 120 allowing setting of various functions and parameters related to various operational modes such as the copy mode and the FAX mode; an ROM (Read Only Memory) 306 for storing a program or programs; an HDD 302 including a hard disk providing a non-volatile storage area capable of storing programs and data even when power supply is shut off; and an RAM 308 providing a storage area when a program is executed.

Image forming apparatus 100 further includes a bus 310 connected to document reading unit 102, image forming unit 104, FAX communication unit 160, operation unit 120, HDD 302, ROM 306, RAM 308, and network I/F 304; and CPU 300 connected to bus 310 and controlling these units and components for realizing general functions of the image forming apparatus.

In HDD 302, various data such as the image data scanned by document reading unit 102 are stored. ROM 306 stores computer programs for realizing general operations of image forming apparatus 100 as well as a computer program for realizing the copy mode process and the FAX mode process, which will be described later. ROM 306 further stores basic screen image data for displaying basic screen images for various operational modes such as the copy mode and the FAX mode.

RAM 308 provides a function of a working memory temporarily storing results of operations and processes by CPU 300, and a function of a frame memory for storing image data. CPU 300 executes control related to various functions of image forming apparatus 100 in accordance with computer programs stored in ROM 306. Specifically, control of various units including document reading unit 102, image forming unit 104, touch-panel display 130 and display operation unit 140 of operation unit 120, HDD 302, ROM 306 and RAM 308 is realized by CPU 300 executing a prescribed computer program.

As shown in FIG. 3, a public line is connected for transmitting/receiving image data, to FAX communication unit 160 of image forming apparatus 100. To network I/F 304, a network line is connected. To the network line, a computer or the like using image forming apparatus 100 as a network-supported printer, or a computer or the like identified by a URL (Uniform Resource Locator) designated through the Internet may be connected. When connected to the Internet through the network line, image forming apparatus 100 can obtain necessary information through the Internet.

<Software Configuration>
(Copy Mode Process)

The program for realizing the copy mode process is activated when the user touches an icon for selecting the copy mode displayed on the home screen image (not shown).

Figure 7:
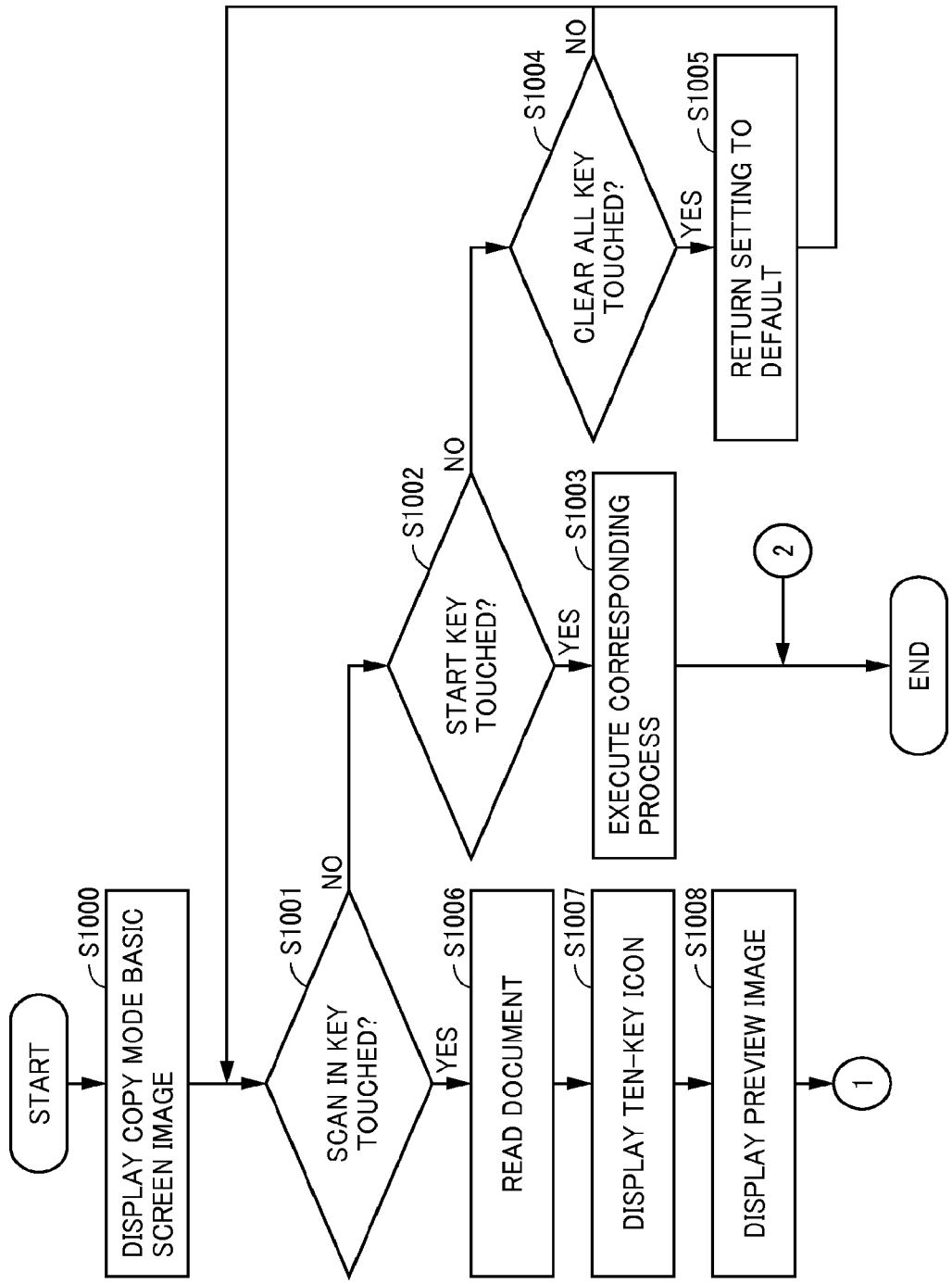
FIGS. 7 and 8 show control structure of a computer program for realizing a copy mode process.

Referring to FIG. 7, the program includes a step S1000 of displaying screen image 7100 (see FIG. 5) as the initial screen image, on display panel 132, and a step S1001 of determining whether or not scan-in key 5102 is touched.

The program further includes a step S1002, executed if it is determined at step S1001 that scan-in key 5102 is not touched (NO), of determining whether or not the start key (monochrome start key 5106 or color start key 5108) is touched, and a step S1003, executed if it is determined at step S1002 that the start key has been touched (YES), of executing the process (the monochrome copy process or the color copy process described above) corresponding to the touched start key.

The program further includes a step S1004, executed if it is determined at step S1002 that the start key has not yet been touched (NO), of determining whether or not clear all key 5104 has been touched, and a step S1005, executed if it is determined at step S1004 that clear all key 5104 has been touched (YES), of cancelling all functions and parameters of which settings have been changed and returning the settings to the default state. If it is determined at step S1004 that clear all key 5104 has not been touched (NO), or after the process of step S1005, the control returns to step S1001.

The program further includes a step S1006, executed if it is determined at step S1001 that scan-in key 5102 is touched (YES), of causing document reading unit 102 to start document reading, a step S1007 of displaying an icon for requesting display of the group of virtual ten keys 3102 on preview area 3000 (hereinafter referred to as a ten-key icon), in place of the group of ten keys 3102, and a step S1008 of displaying a preview image based on the scan data on preview area 3000.

Figure 8:
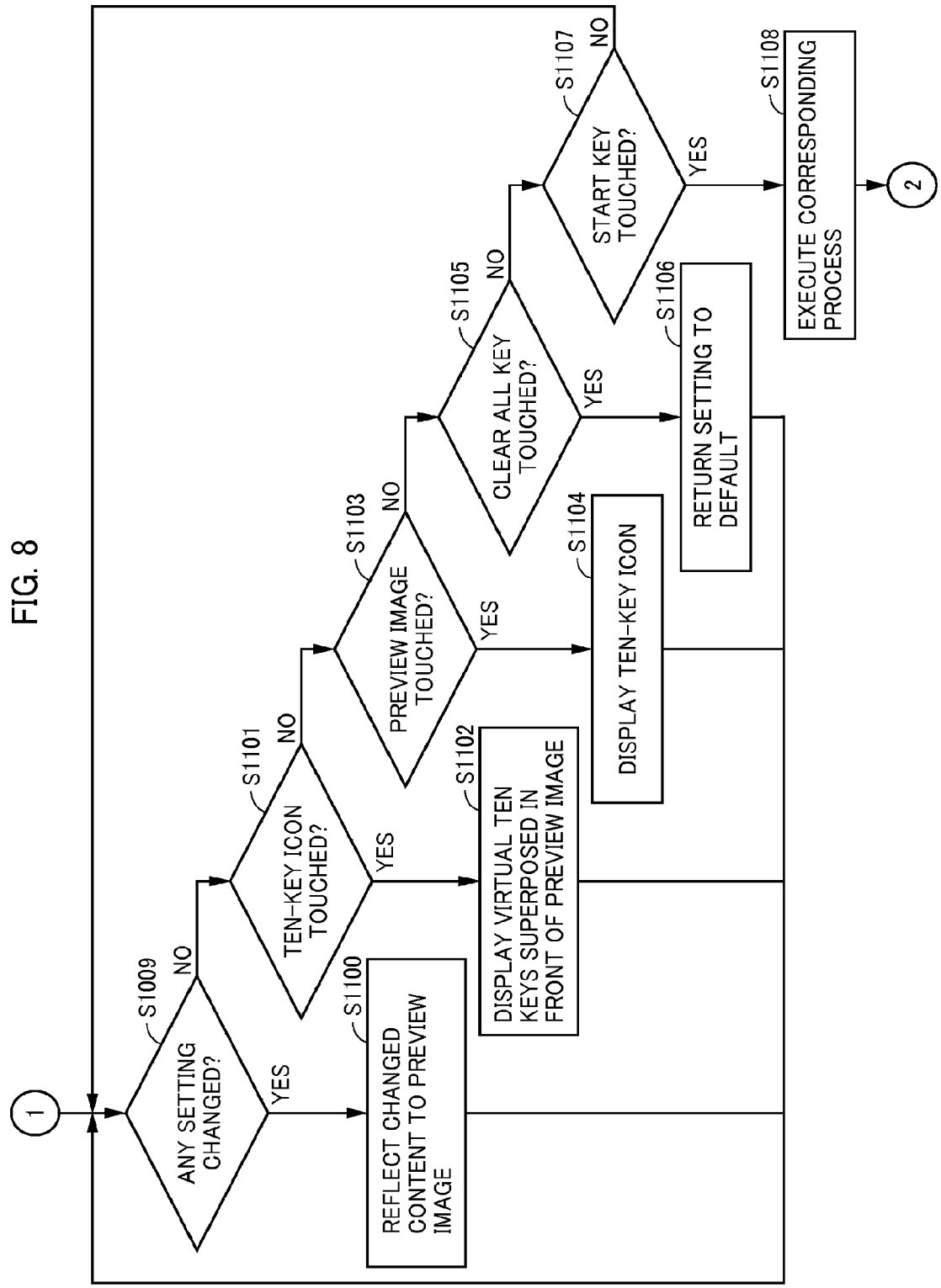

Referring to FIG. 8, the program further includes a step S1009 of determining whether or not there is any parameter of which setting has been changed, and a step S1100, executed if it is determined at step S1009 that there is a function or parameter of which setting has been changed (YES), of reflecting the contents of setting change on the preview image displayed in preview area 3000. Here, the preview image is displayed on the front-most side of preview area 3000.

The program further includes a step S1101, executed if it is determined at step S1009 that there is not a function or parameter of which setting has been changed (NO), of determining whether or not the ten-key icon displayed on preview area 3000 has been touched, and a step S1102, executed if it is determined at step S1001 that the ten-key icon has been touched, of displaying the group of virtual ten keys 3102 superposed in front of the preview image, in place of the ten-key icon.

The program further includes a step S1103, executed if it is determined at step S1101 that the ten-key icon has not been touched (NO), of determining whether or not the preview image displayed on preview area 3000 has been touched, and a step S1104, executed if it is determined at step S1103 that the preview image has been touched (YES), of displaying the ten-key icon in place of the group of virtual ten keys 3102.

The program further includes a step S1105, executed if it is determined at step S1103 that the preview image is not touched (NO), of determining whether or not clear all key 5104 has been touched, and a step S1106, executed if it is determined at step S1105 that clear all key 5104 has been touched (YES), of cancelling all functions and parameters of which settings have been changed, and returning the settings to the default state.

The program further includes a step S1107, executed if it is determined at step S1105 that the clear all key has not been touched (NO), of determining whether or not the start key (monochrome start key 5106 or color start key 5108) has been touched, and a step S1108, executed if it is determined at step S1107 that the start key has been touched (YES), of executing the process (monochrome copy process or color copy process based on the scan data) corresponding to the touched start key.

If it is determined at step S1107 that the start key has not been touched (NO), or after the process of step S1100, S1102, S1104 or S1106, the control returns to step S1009.

In the present embodiment, the process from step S1006 to step S1008 described above correspond to the scan-in process in the copy mode.

(FAX Mode Process)

The program for realizing the FAX mode process is activated when the user touches an icon for selecting the FAX mode displayed on the home screen image (not shown).

Figure 9:
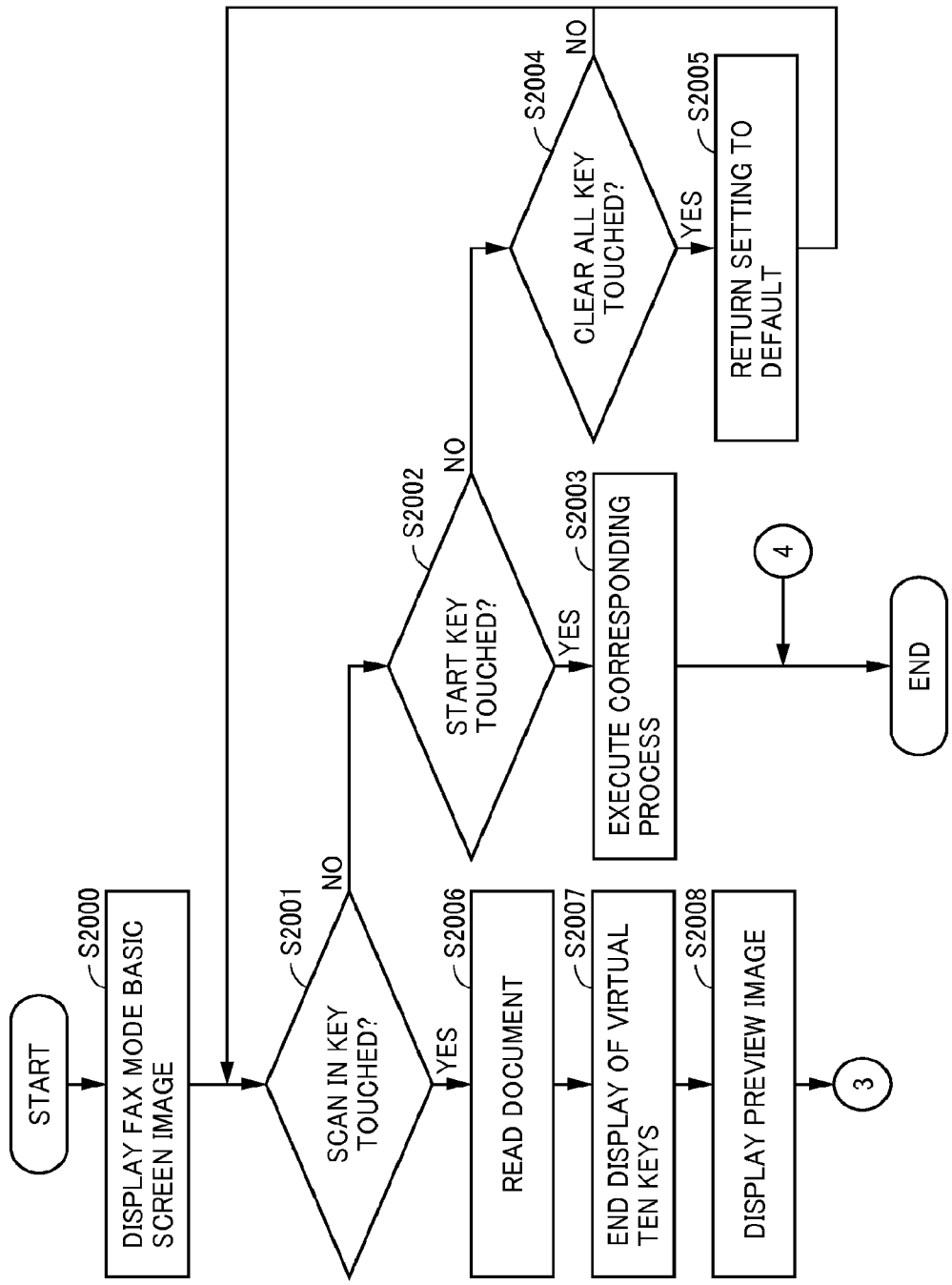
FIGS. 9 and 10 show control structure of a computer program for realizing a FAX mode process.

Referring to FIG. 9, the program includes a step S2000 of displaying FAX mode basic screen image 7300 (see FIG. 6)

as the initial screen image on display panel 132, and a step S2001 of determining whether or not scan-in key 5302 has been touched.

The program further includes a step S2002, executed if it is determined at step S2001 that scan-in key 5302 has not been touched (NO), of determining whether or not start key 5306 has been touched, and a step S2003, executed if it is determined at step S2002 that start key 5306 has been touched (YES), of executing the process (FAX transmission process described above) corresponding to the touched start key 5306.

The program further includes a step S2004, executed if it is determined at step S2002 that start key 5306 has not been touched (NO), of determining whether or not clear all key 5304 has been touched, and a step S2005, executed if it is determined at step S2004 that clear all key 5304 has been touched (YES), of cancelling all functions and parameters of which settings have been changed, and returning the settings to the default state. If it is determined at step S2004 that clear all key 5304 is not touched (NO), or after the process of step S2005, the control returns to step S2001.

The program further includes a step S2006, executed if it is determined at step S2001 that scan-in key 5302 has been touched (YES), of causing document reading unit 102 to start document reading, a step S2007 of ending the display of the group of virtual ten keys 3302 displayed on preview area 3000 (closing background area 3303), and a step S2008 of displaying the preview image based on the scan data on preview area 3000.

Figure 10:
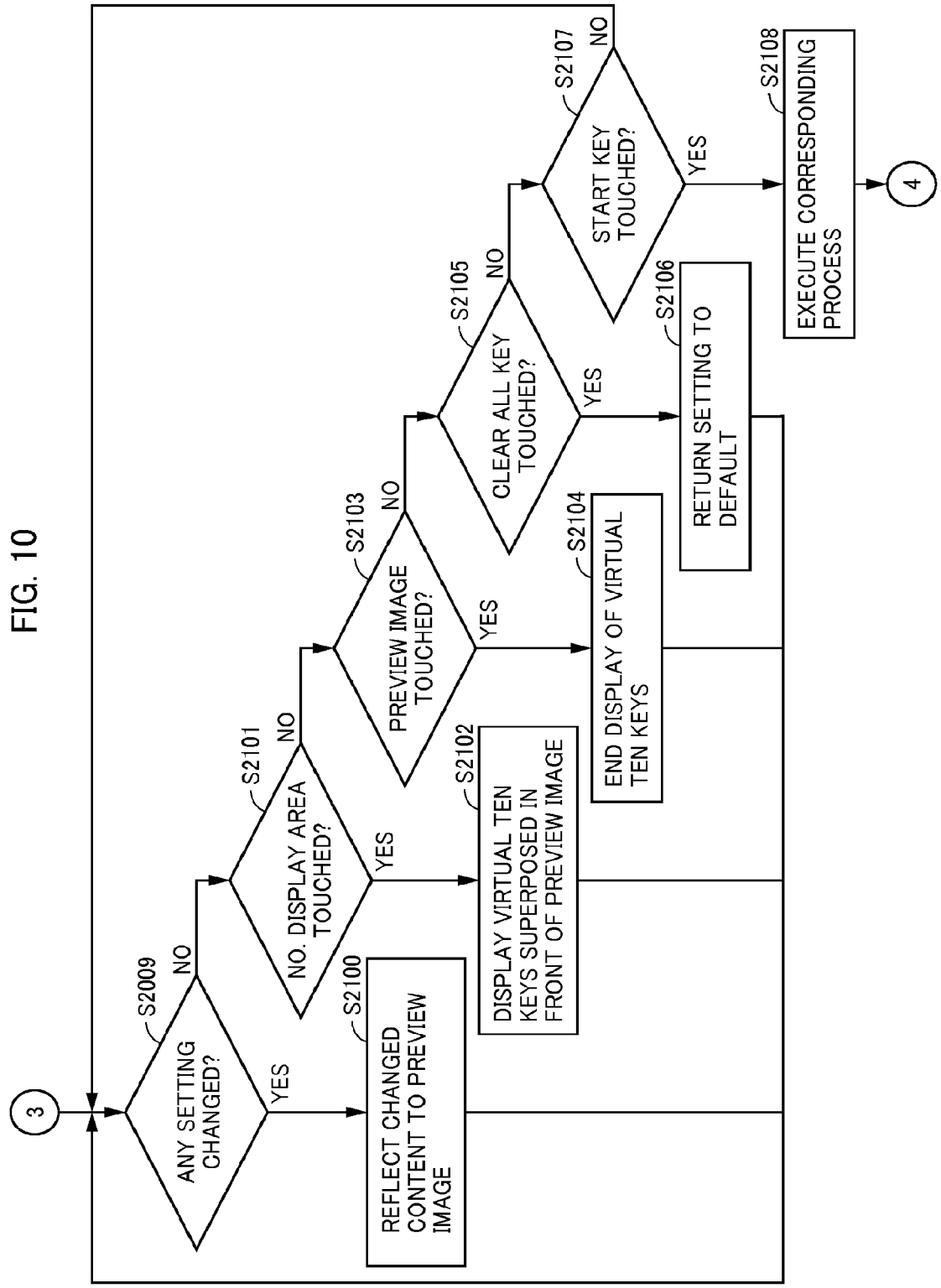
Figure 11:
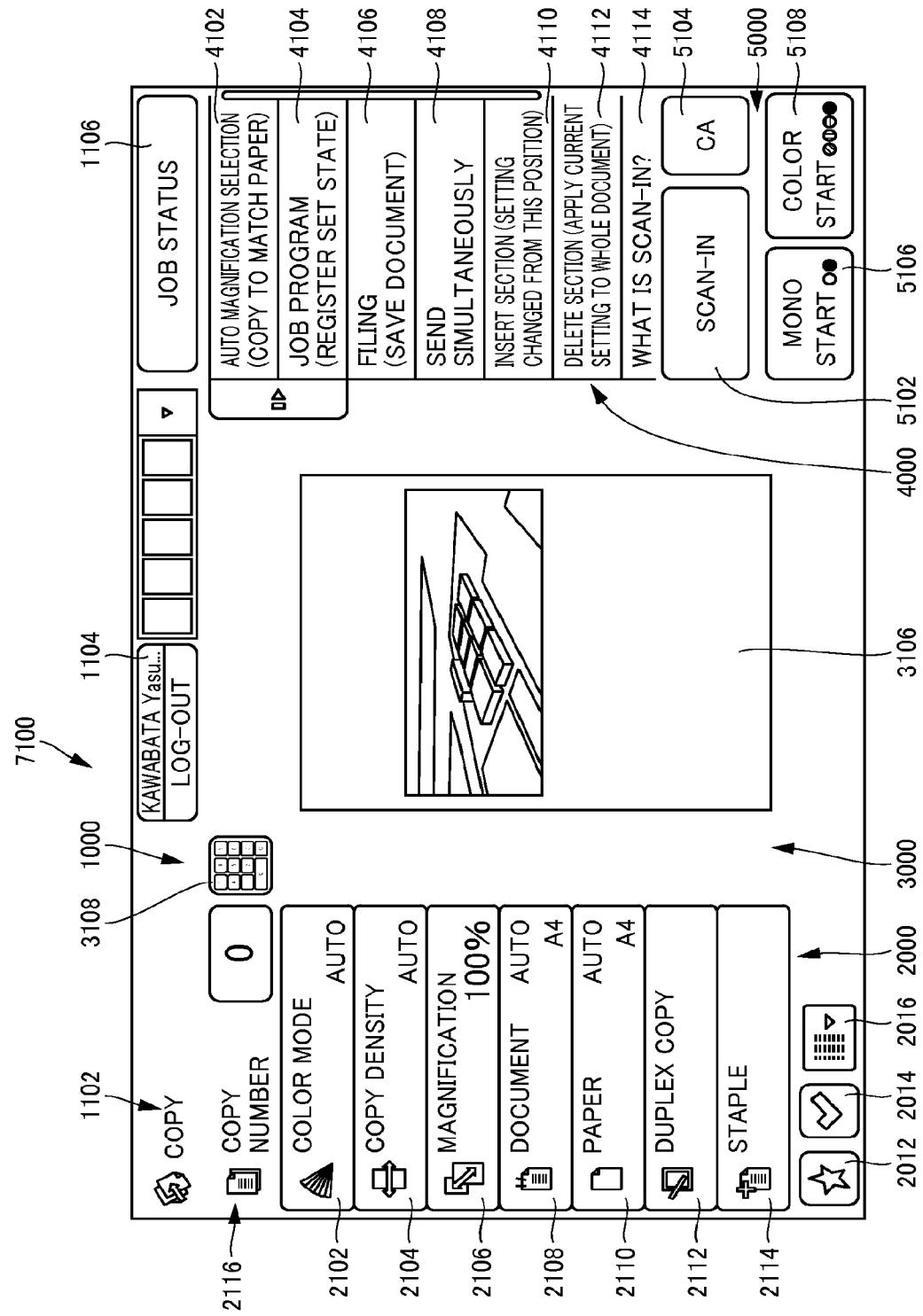
FIG. 11 shows a state of the copy mode basic screen image when a scan-in process ends.
Figure 12:
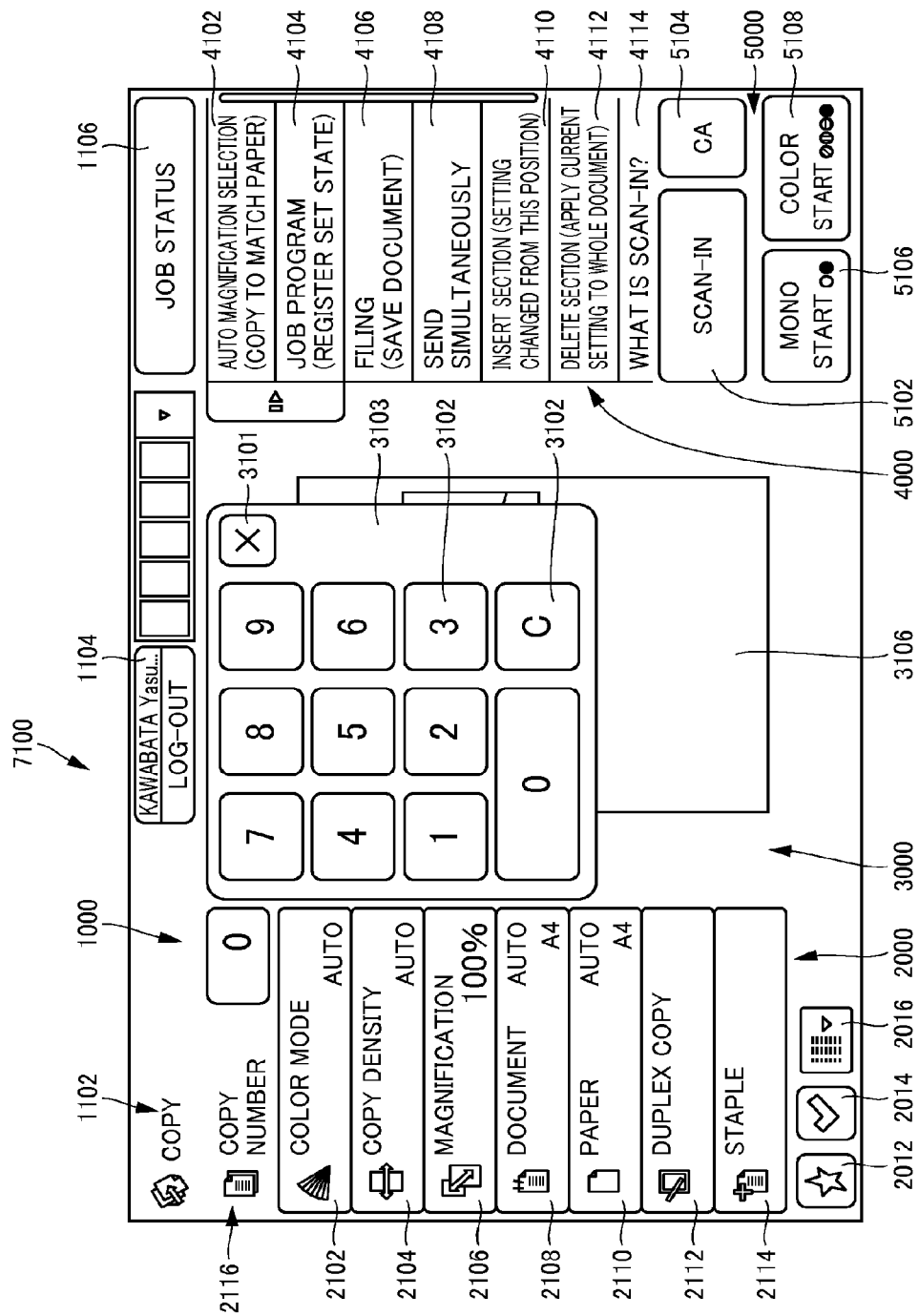
FIG. 12 shows a state of the copy mode basic screen image when a ten-key icon is touched.
Figure 13:
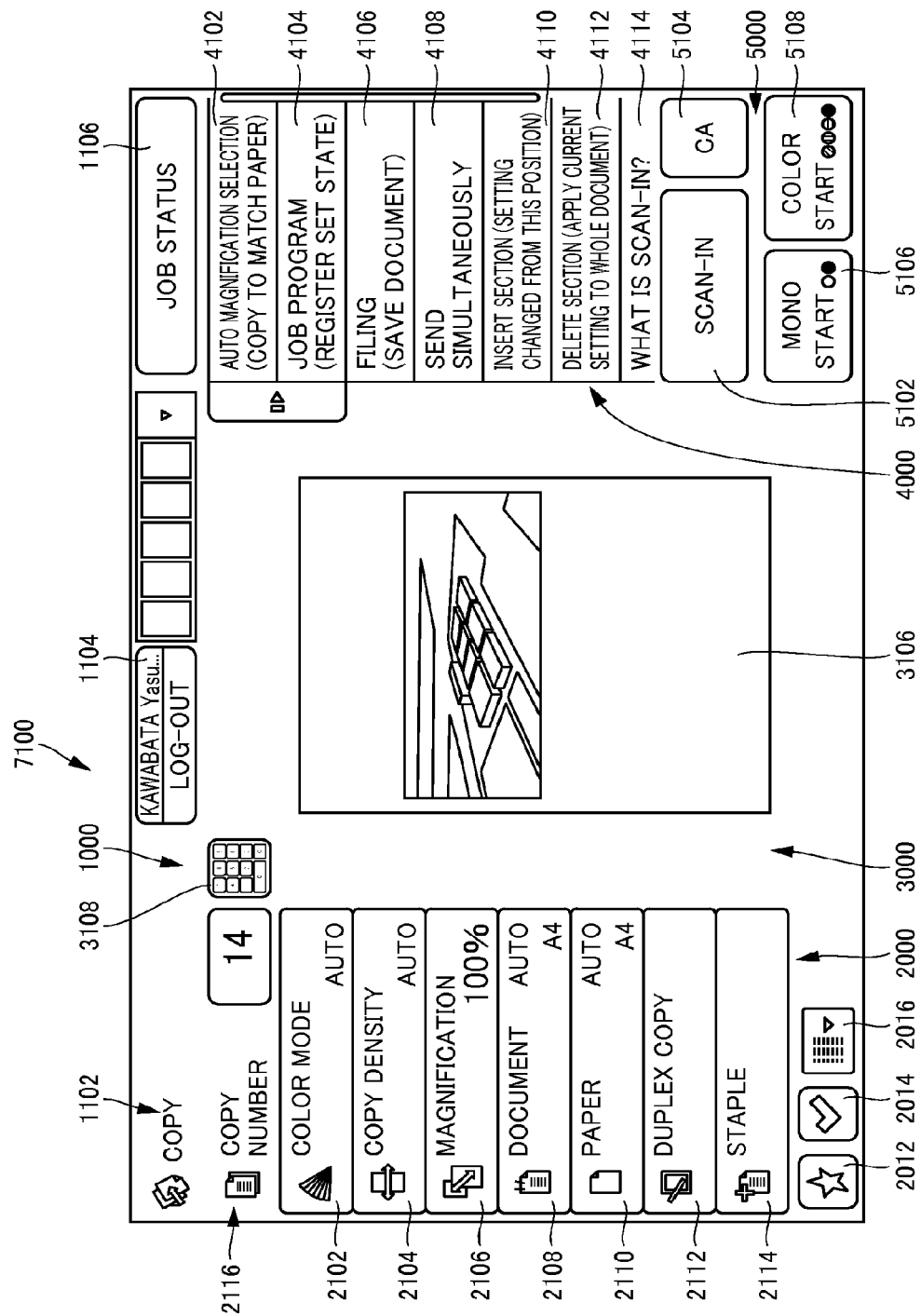
FIG. 13 shows a state of the copy mode basic screen image when a preview image is touched.

Referring to FIG. 10, the program further includes a step S2009 of determining whether or not there is any function or parameter of which setting has been changed, and a step S2100, executed if it is determined at step S2009 that there is a function or parameter of which setting has been changed (YES), of reflecting the contents of setting change on the preview image displayed in preview area 3000. Here, the preview image is displayed on the front-most side of preview area 3000.

The program further includes a step S2101, executed if it is determined at step S2009 that there is no function or parameter of which setting has been changed (NO), of determining whether or not number display area 1304 displayed on system area 1000 has been touched, and a step S2102, executed if it is determined at step S2101 that number display area 1304 has been touched (YES), of displaying the group of virtual ten keys 3302 superposed on the front side of the preview image.

The program further includes a step S2103, executed if it is determined at step S2101 that number display area 1304 has not been touched (NO), of determining whether or not the preview area displayed in preview area 3000 has been touched, and a step S2104, executed if it is determined at step S2103 that the preview image has been touched (YES), of ending the display of the group of virtual ten keys 3302.

The program further includes a step S2105, executed if it is determined at step S2103 that the preview image has not been touched (NO), of determining whether or not clear all key 5304 has been touched, and a step S2106, executed if it is determined at step S2105 that clear all key 5304 has been touched (YES), of cancelling all functions and parameters of which settings have been changed and returning the settings to the default state.

The program further includes a step S2107, executed if it is determined at step S2105 that clear all key 5304 has not been touched (NO), of determining whether or not start key 5306 has been touched, and a step S2108, executed if it is determined at step S2107 that start key 5306 has been touched (YES), of executing the process (FAX transmission process based on the scan data) corresponding to the touched start key 5306.

If it is determined at step S2107 that start key 5306 has not been touched (NO), or after the process of step S2100, S2102, S2104 or S2106, the control returns to step S2009.

In the present embodiment, the process from step S2006 to step S2008 described above corresponds to the scan-in process in the FAX mode.

<Operation>

Referring to FIGS. 1 to 17, image forming apparatus 100 operates in the following manner. General operations of image forming apparatus 100 except for the operation described below are the same as those of a conventional image forming apparatus.

—Operation in the Copy Mode—

The user presses home key 148 of display operation unit 140. When home key 148 is pressed, the home screen image (not shown) appears on display panel 132. The user touches an icon for selecting the copy mode displayed on the home screen image. In response, screen image 7100 (see FIG. 5) appears as the initial screen image, on display panel 132 (step S1000). It is assumed that at this time, various functions and parameter settings in the copy mode are in the default (standard) state.

The user confirms screen image 7100, and if setting change is to be made, he/she touches various setting keys 2102 to 2114 displayed in area 2000, to change the settings of various functions and parameters in the copy mode. Here, if the user touches clear all key 5104 (YES at step S1004), all functions and parameters of which settings have been changed are cancelled, and the settings can be returned to the default state (step S1005).

Assume that the user wishes to confirm the preview image of the document image before starting the copy process, so that he/she touches scan-in key 5102 after placing the document manually on the platen. When scan-in key 5102 is touched (YES at step S1001), the image forming apparatus executes the scan-in process in the copy mode in the following manner.

In the scan-in process, first, document reading unit 102 starts reading of the document placed on the platen (step S1006). When document reading starts, ten-key icon 3108 for requesting display of the group of virtual ten keys 3102 is displayed, in place of the group of virtual ten keys 3102, on preview area 3000 of screen image 7100 (step S1007). Ten key icon 3108 is displayed close to area 2116 (see FIG. 11).

The scan data read by document reading unit 102 is input to CPU 300. CPU 300 executes various image processing operations on the input scan data, and displays a preview image 3106 based on the scan data on preview area 3000 of screen image 7100, in place of mimic image 3104 (step S1008). Here, the scan data is temporarily stored in a storage device (for example, RAM (Random Access Memory) 308 shown in FIG. 3).

When the scan-in process ends, the user confirms preview image 3106, and if setting conditions are to be changed, he/she touches various setting keys 2102 to 2114 displayed on area 2000, to change the settings of various functions and parameters in the copy mode. Here, if the user touches clear all key 5104 (YES at step S1105), all functions and parameters of which settings have been changed are cancelled, and the settings can be returned to the default state (step S1106).

If the setting conditions have been changed by the user, it is determined by CPU 300 that there is a function or parameter of which setting has been changed (YES at step S1009), and the contents of setting change are reflected on preview image 3106 (step S1100). At this time, preview image 3106 is displayed on the front-most side of preview area 3000.

In order to input a desired number of copies, the user touches ten-key icon 3108 displayed in preview area 3000. When ten-key icon 3108 is touched (YES at step S1101), the group of virtual ten keys 3102 is displayed superposed on the front side of preview image 3106 in preview area 3000, in place of ten-key icon 3108 (step S1102). Here, the group of virtual ten keys 3102 is displayed not fully hiding preview image 3106, so that at least a part of preview image 3106 is viewable (see FIG. 12).

The user inputs the desired numerical value (in the present embodiment, 14) by touching the displayed group of virtual ten keys 3102. In area 2116, the input numerical value is displayed. After the input of numerical value by the user, if a predetermined, prescribed time (in the present embodiment, 3 seconds) passes without any operation by the user, the input numerical value is set as the number of copies.

After setting the number of copies, the user touches preview image 3106. When preview image 3106 is touched (YES at step S1103), ten-key icon 3108 is displayed close to area 2116, in place of the group of virtual ten keys 3102, on preview area 3000 (step S1104). Thus, preview image 3106 as a whole is displayed (see FIG. 13).

The user confirms the set number of copies displayed on area 2116 and preview image 3106, and thereby confirms the manner of output. If all are considered acceptable, the user touches monochrome start key 5106 or color start key 5108. In response (YES at step S1107), the monochrome copy process or the color copy process based on the scan data read by the scan-in process is executed (step S1108).

It may be the case that the user wishes to execute the copy process directly, omitting confirmation of the preview image of document image. In such a case, the user directly touches monochrome start key 5106 or color start key 5108, without touching scan-in key 5102. In response (YES at step S1002), the normal monochrome copy process or color copy process is executed (step S1003).

After the end of monochrome copy process or color copy process, screen image 7100 (see FIG. 5), which is the initial screen image, is displayed on display panel 132. It is assumed that regarding the settings of various functions and parameters in the copy mode at this time, the conditions set for the previous copy process are maintained.

—Operation in the FAX Mode—

The user presses home key 148 of display operation unit 140. When home key 148 is pressed, the home screen image (not shown) appears on display panel 132. The user touches an icon for selecting the FAX mode displayed on the home screen image. In response, FAX mode basic screen image 7300 (see FIG. 6) appears as the initial screen image, on display panel 132 (step S2000). It is assumed that at this time, various functions and parameter settings in the FAX mode are in the default (standard) state.

The user confirms FAX mode basic screen image 7300, and if setting change is to be made, he/she touches various setting keys 2302 to 2314 displayed in area 2000, to change the settings of various functions and parameters in the FAX mode. Here, if the user touches clear all key 5304 (YES at step S2004), all functions and parameters of which settings have been changed are cancelled, and the settings can be returned to the default state (step S2005).

Assume that the user wishes to confirm the preview image of the FAX document image before starting the FAX transmission process. Then, he/she touches scan-in key 5302 after placing the document manually on the platen. In response (YES at step S2001), the scan-in process in the FAX mode is executed in the following manner.

Figure 14:
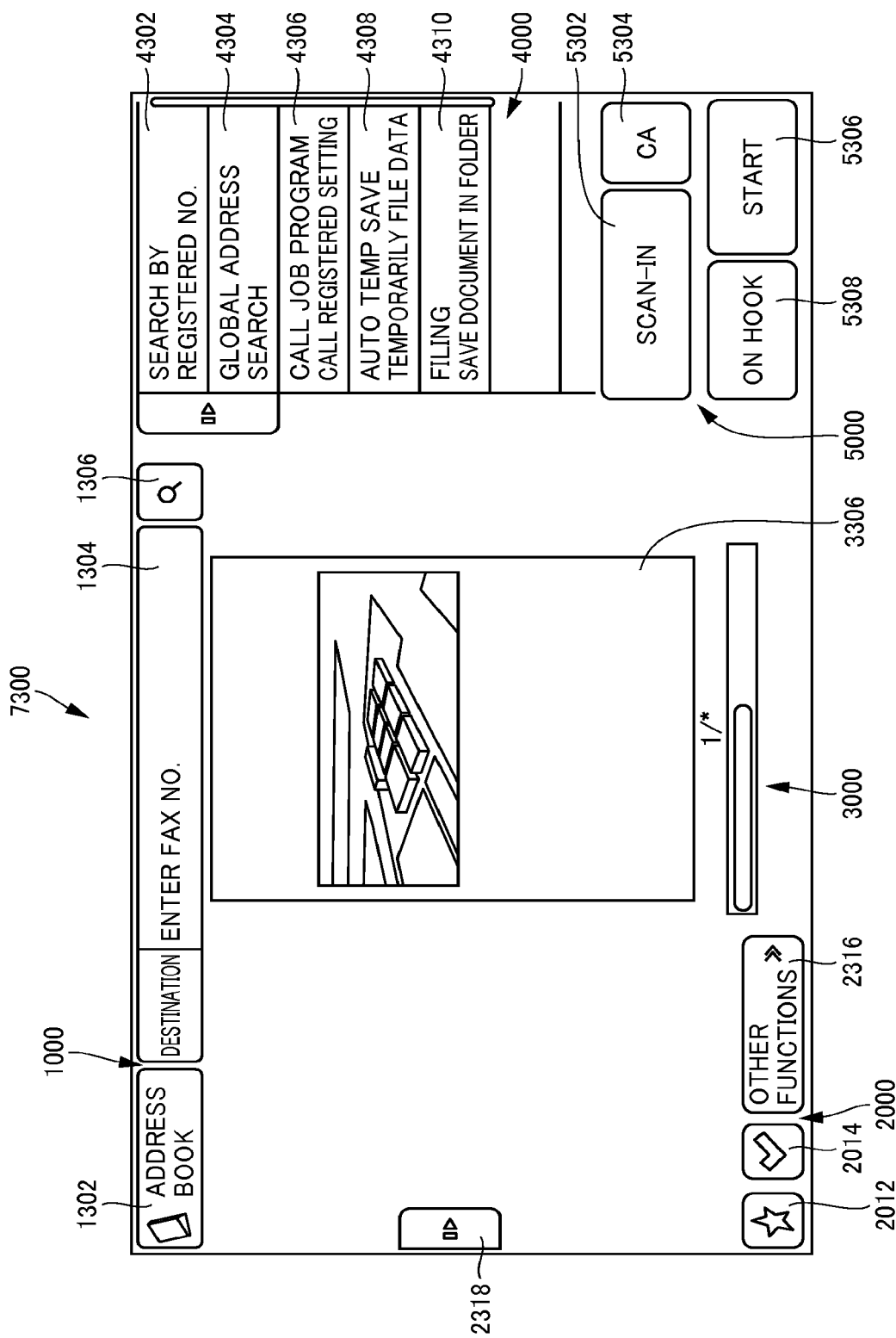
FIG. 14 shows a state of the FAX mode basic screen image when the scan-in process ends.

In the scan-in process, first, document reading unit 102 starts reading of the document placed on the platen (step S2006). Referring to FIG. 14, when reading of the FAX document starts, in preview area 3000 of FAX mode basic screen image 7300, display of the group of virtual ten keys 3302 ends (step S2007). Further, various setting keys 2302 to 2314 in area 2000 are hidden on the left side of the screen image and, in place of various setting keys 2302 to 2314, a tab key 2318 is displayed.

The scan data read by document reading unit 102 is input to CPU 300. CPU 300 performs various image processing operations on the input scan data, and thereafter displays preview image 3306 based on the scan data on preview area 3000 of FAX mode basic screen image 7300, in place of window 3304 (step S2008). Here, the scan data is temporarily stored in a storage device (for example, RAM (Random Access Memory) 308 shown in FIG. 3).

Figure 15:
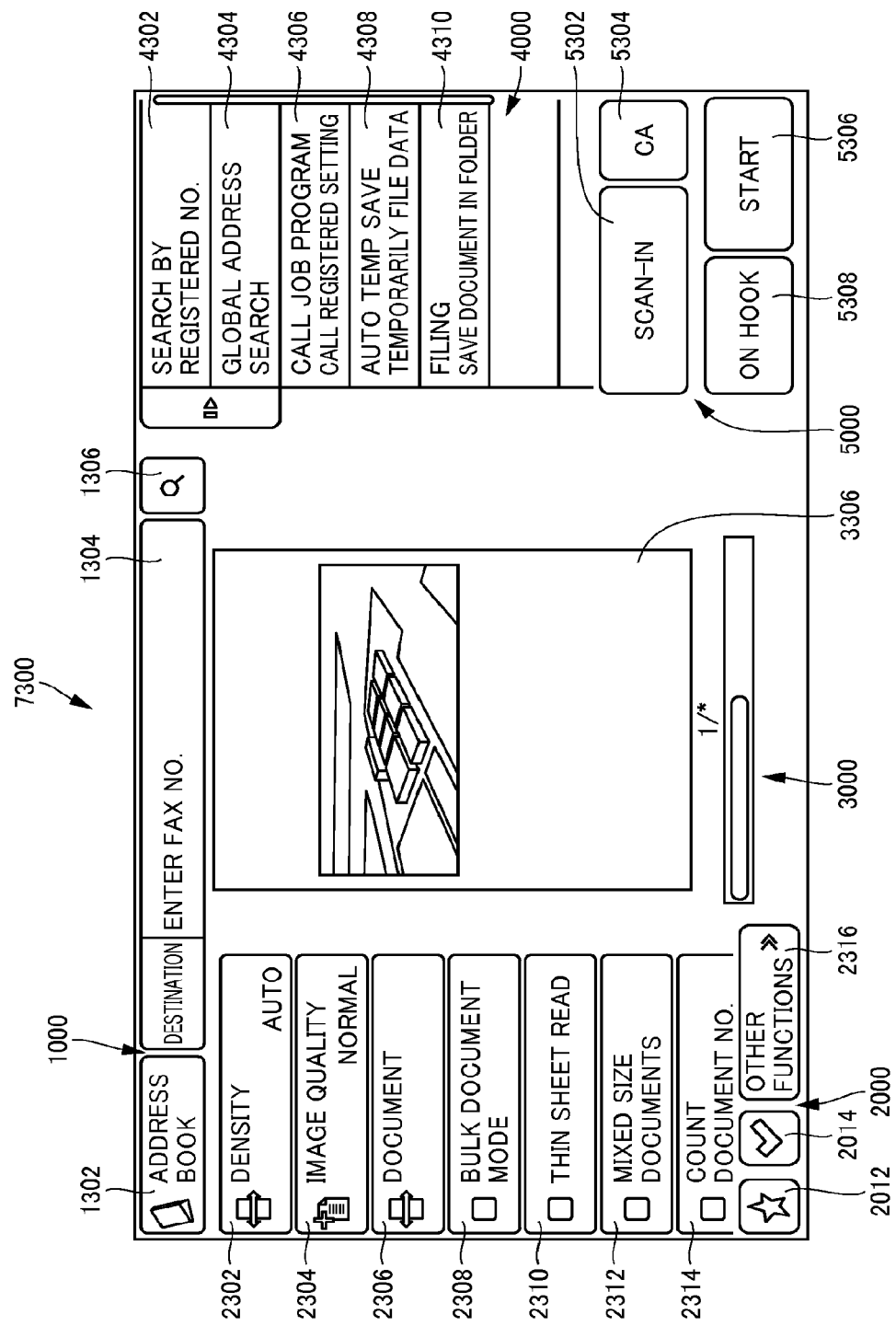
FIG. 15 shows a state of the FAX mode basic screen image when a gesture operation is made on a tab key.
Figure 16:
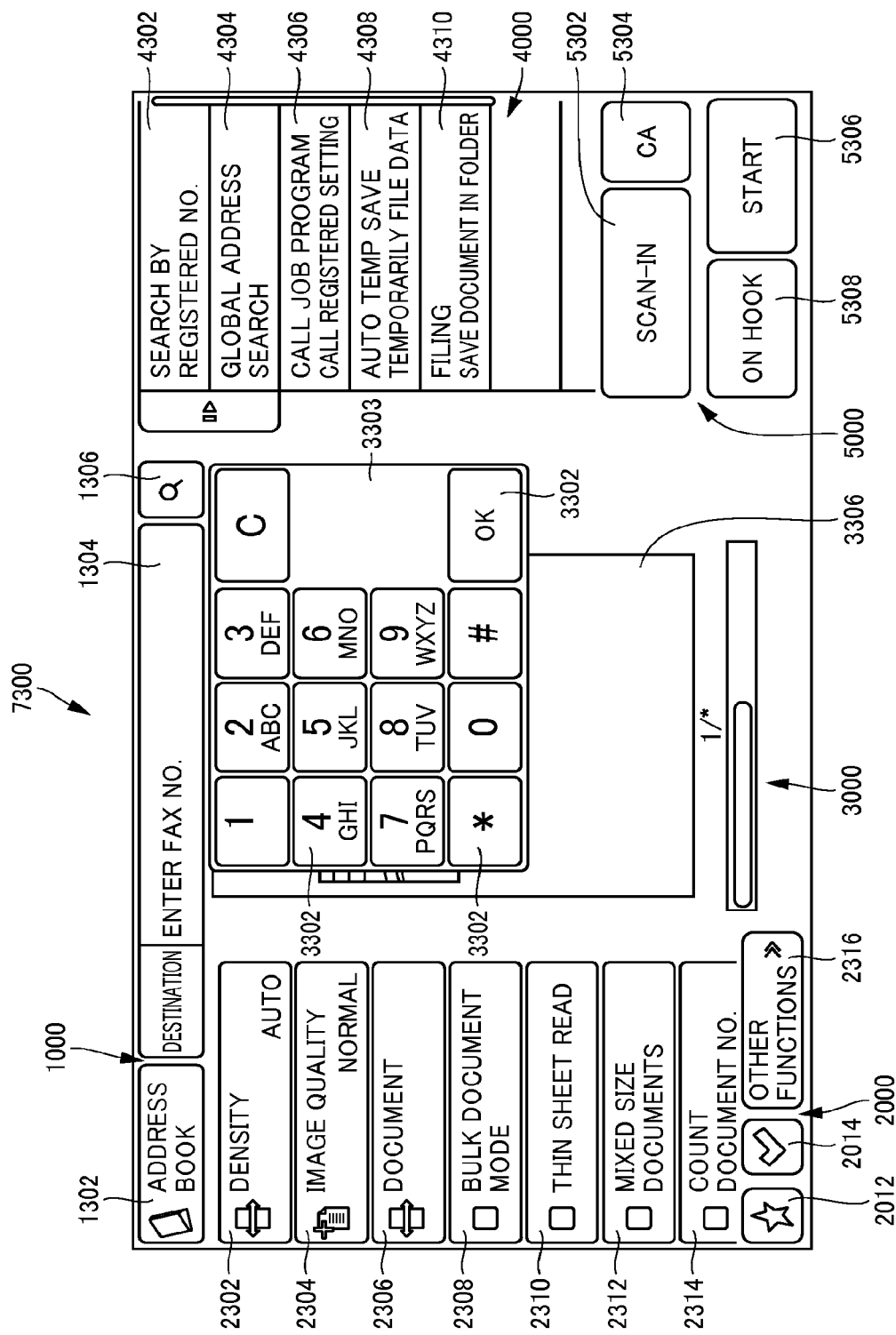
FIG. 16 shows a state of the FAX mode basic screen image when a number display area is touched.
Figure 17:
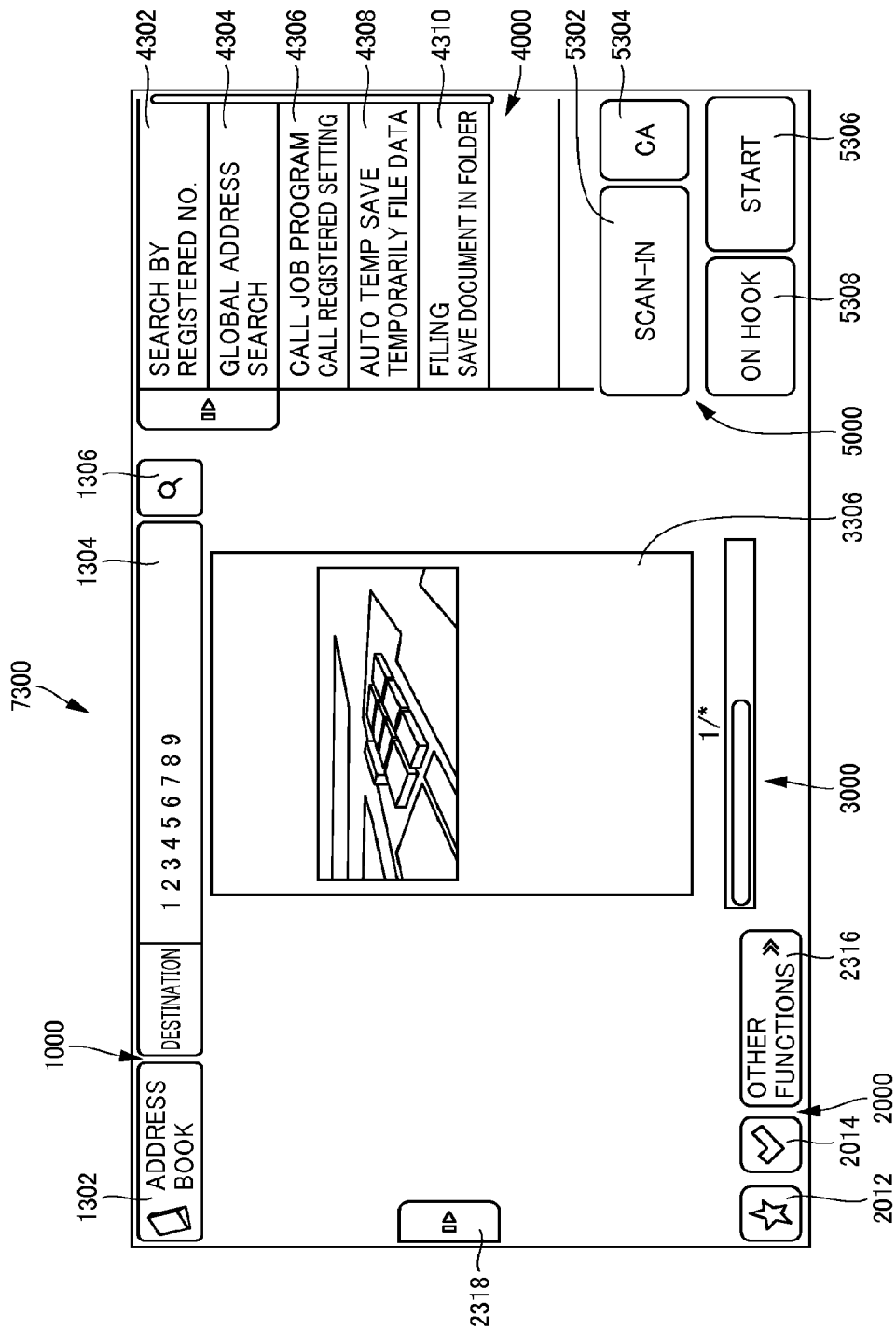
FIG. 17 shows a state of the FAX mode basic screen image when the preview image is touched.

After the end of scan-in process, the user confirms preview image 3306, and if setting condition is to be changed, he/she makes a gesture operation of moving tab key 2318 from the left to the right side of the screen image, so that various setting keys 2302 to 2314 are displayed on area 2000 (see FIG. 15). Settings of various functions and parameters in the FAX mode are changed by touch operations on various setting keys 2302 to 2314. Here, if the user touches clear all key 5304 (YES at step S2105), all functions and parameters of which settings have been changed are cancelled, and the settings can be returned to the default state (step S2106).

If the setting conditions have been changed by the user, it is determined by CPU 300 that there is a function or parameter of which setting has been changed (YES at step S2009), and preview image 3306 is changed reflecting the contents of the changed setting or settings (step S2100). At this time, preview image 3306 is displayed on the front-most side of preview area 3000.

In order to input a desired FAX number, the user touches number display area 1304 displayed on system area 1000. When number display area 1304 is touched (YES at step S2101), the group of virtual ten keys 3302 is displayed partially superposed in front of preview image 3306, on preview area 3000 (step S2102). Here, the group of virtual ten keys 3302 is displayed not fully hiding preview image 3306, so that at least a part of preview image 3306 is viewable (see FIG. 16).

The user inputs the desired numerical value (in the present embodiment, 123456789) by touching the displayed group of virtual ten keys 3302. In number display area 1304, the input numerical value is displayed. After the input of numerical value by the user, if a predetermined, prescribed time (in the present embodiment, 3 seconds) passes without any operation by the user, the input numerical value is set as the FAX number of transmission destination.

After setting the FAX number of transmission destination, the user touches preview image 3306 displayed on preview area 3000. When preview image 3306 is touched (YES at step S2103), the display of the group of virtual ten keys 3102 on preview area 3000 ends (step S2104). Consequently, preview image 3306 as a whole is displayed. Further, the user moves various setting keys displayed on area 2000 by a gesture operation from the right to the left side of the screen image, so that various setting keys 2302 to 2314 are hidden on the left side of the screen image, so that tab key 2318 is again displayed (see FIG. 17).

The user confirms the FAX number of transmission destination displayed on number display area 1304 and preview image 3306, and thereby confirms the manner of output. If all are considered acceptable, the user touches start key 5306. In response (YES at step S2107), the FAX communication process based on the scan data read by the scan-in process is executed (step S2108).

It may be the case that the user wishes to execute the FAX transmission process directly, omitting confirmation of the preview image of FAX document image. In such a case, the user directly touches start key 5306 without touching scan-in key 5302. When start key 5306 is touched (YES at step S2002), the normal FAX transmission process is executed (step S2003).

After the end of FAX transmission process, FAX mode basic screen image 7300 (see FIG. 6), which is the initial screen image, is displayed on display panel 132. It is assumed that regarding the settings of various functions and parameters in the FAX mode at this time, the conditions set for the previous FAX transmission process are maintained.

<Function/Effect>

According to the embodiment described above, operation unit 120 with touch-panel display 130 is provided on image forming apparatus 100 including: document reading unit 102 for inputting image data; and image forming unit 104 and FAX communication unit 160 for outputting the input image data. Touch-panel display 130 includes display panel 132 for displaying screen image 7100 or 7300 including virtual keys, and touch-panel 134 for receiving an operation on the virtual keys. On screen image 7100 or 7300, a group of virtual ten keys 3102 or 3302 allowing input of the number of copies or the FAX number is displayed, as virtual keys. When the image data is input from document reading unit 102, touch-panel display displays preview image 3106 or 3306 based on the image data on basic screen image 7100 or 7300 with higher priority than the group of virtual ten keys 3102 or 3302.

In the input standby state waiting for the input of image data, the group of virtual ten keys 3102 or 3302 is displayed on basic screen image 7100 or 7300. Therefore, in the image data input standby state, the user can make an ordinary input operation on the group of virtual ten keys 3102 or 3302 without requesting display of the group of virtual ten keys 3102 or 3302. Therefore, no operation is necessary for displaying the group of virtual ten keys. As a result, an operation console with superior user operability can be provided.

When the image data is input, it is highly likely that the user wishes to confirm the contents of preview image 3106 or 3306. Therefore, preview image 3106 or 3306 is displayed with higher priority than the group of virtual ten keys 3102 or 3302. No operation is necessary to delete the group of virtual ten keys. Thus, an operation console having superior user operability and visibility can be provided.

Further, according to the above-described embodiment, when image data is input from document reading unit 102, touch-panel display 130 displays, in place of the group of virtual ten keys 3102 or 3302, ten-key icon 3108 or number display area 1304 for requesting display of the group of virtual ten keys 3102 or 3302 on screen image 7100 or 7300 with higher priority than preview image 3106 or 3306. When the image data is input, display of the group of virtual ten keys 3102 or 3302 ends. Therefore, the user can more easily confirm the contents of preview image 3106 or 3306. If the user wishes to input the number of copies or the FAX number, the group of virtual ten keys 3102 or 3302 can be displayed with higher priority than preview image 3106 or 3306, by an input operation to ten-key icon 3108 or number display area 1304. Therefore, user operability is improved.

Further, according to the above-described embodiment, basic screen image 7100 includes area 2116 for displaying the number of copies, and ten-key icon 3108 is displayed close to area 2116. Therefore, the function of ten-fkey icon 3108 can more easily be understood, and when the user wishes to input the number of copies, he/she can easily find the position of ten-key icon 3108. Accordingly, input operation using ten-key icon 3108 is facilitated, and user operability can further be improved.

Further, according to the above-described embodiment, when a touch operation of ten-key icon 3108 or number display area 1304 is received, in response, touch-panel display 130 displays the group of virtual ten keys 3102 or 3302 superposed on the front side of preview image 3106 or 3306 on screen image 7100 or 7300, with at least a part of preview image 3106 or 3306 kept viewable. It is possible for the user to confirm a part of the contents of preview image 3106 or 3306 and, therefore, he/she can set conditions such as the number of copies or the input of FAX number while he/she is surely aware on which image the conditions are to be set. Thus, the user can make various settings related to the image with ease and without confusion.

Further, according to the above-described embodiment, when an input operation to preview image 3106 or 3306 is received, touch-panel display 130 displays ten-key icon 3108 or number display area 1304 on screen image 7100 or 7300 in response to the input operation, in place of the group of virtual ten keys 3102 or 3302. A part of preview image 3106 or 3306 is kept displayed. Therefore, if the user wishes to confirm the contents of preview image 3106 or 3306, he/she may make an input operation on the preview image to end the display of the group of virtual ten keys 3102 or 3302. As a result, it is possible for the user to easily confirm the contents of preview image 3106 or 3306. Further, if the user wishes to input the number of copies or the FAX number, the group of virtual ten keys 3102 or 3302 can be displayed with higher priority than preview image 3106 or 3306, by an input operation to ten-key icon 3108 or number display area 1304. Therefore, user operability is improved.

Further, according to the above-described embodiment, on basic screen image 7100 or 7300, monochrome start key 5106 and color start key 5108, or start key 5306 for requesting start of the copy process or the FAX transmission process by image forming unit 104 or FAX communication unit 160 is always displayed, as a virtual key. Regardless of the state of display of touch-panel display 130, it is possible for the user to immediately execute the process by image forming unit 104 or by FAX communication unit 160 by an input operation to monochrome start key 5106, color start key 5108 or start key 5306. Thus, user convenience can further be improved.

Further, according to the above-described embodiment, in response to the input operation to monochrome start key 5106, color start key 5108 or start key 5306, touch-panel display 130 returns the state of display on touch-panel display 130 to the state before the input of image data from document reading unit 102. At the end of copy process or FAX transmission process by image forming unit 104 or FAX communication unit 160, basic screen image 7100 or 7300 is displayed, and the group of virtual ten keys 3102 or 3302 is displayed. In the image data input standby state, it is possible for the user to make an ordinary input operation on the group of virtual ten keys 3102 or 3302, without requesting the display of the group of virtual ten keys 3102 or 3302. Therefore, user operability can further be improved.

Further, according to the above-described embodiment, image forming apparatus 100 includes operation unit 120 having superior operability and visibility. Therefore, erroneous printing or erroneous transmission by image forming unit 104 or FAX communication unit 160 resulting from an erroneous operation by the user can be reduced. Thus, image forming apparatus 100 with high user convenience can be provided.

<Modifications>

Figure 18:
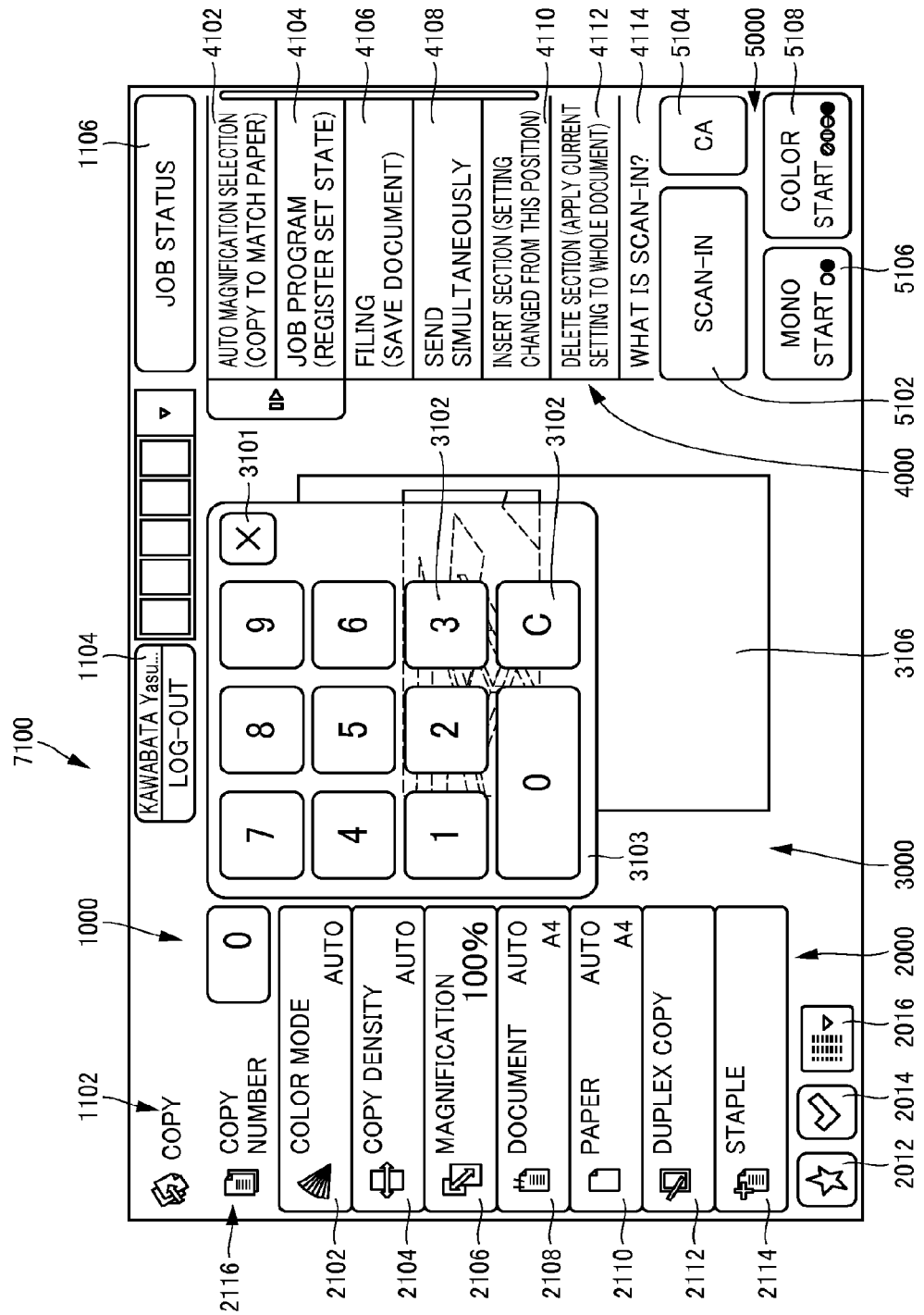
FIG. 18 shows an example of a group of transparent virtual ten keys.

In the embodiment above, when the group of virtual ten keys 3102 or 3302 is displayed, preview image 3106 or 3306 is hidden by non-transparent background area 3103 or 3303. The present invention, however, is not limited to such an embodiment. By way of example, background area 3103 may be provided as a transparent, see-through image, so that preview image 3106 is not hidden by background area 3103, as is shown in FIG. 18. Even when the group of virtual ten keys 3102 is displayed in front of preview image 3106, the user can easily confirm the contents of preview image 3106. As a result, it is possible for the user to set conditions such as the input of the number of copies, easily grasping on which image the output is set. Thus, the user can make settings related to the image with ease and without confusion. As to the transparency of background area 3103, any portion not having any influence to the touch operation may be made transparent other than background area 3103 (3303). By way of example, the group of virtual ten keys 3102 or 3302 may be made transparent, as long as the numerals and signs are visible.

In the embodiment above, at the end of copy process or FAX transmission process, basic screen image 7100 (see FIG. 5) or basic screen image 7300 (see FIG. 6) as the initial screen image is displayed. The present invention, however, is not limited to such an embodiment. By way of example, basic screen image 7100 (see FIG. 12) or basic screen image 7300 (see FIG. 16) having preview image 3106 or 3306 displayed on the background side of the group of virtual ten keys 3102 or 3302 may be displayed. In that case, regarding the settings of various functions and parameters in the copy mode or the FAX mode, it is assumed that the conditions set at the last copy process or FAX transmission process are maintained. Further, it is assumed that, as preview image 3106 or 3306, an image based on the scan data read by the scan-in process at the time of last copy process or last FAX transmission process is displayed. Therefore, when the user is to perform additional copy process or FAX transmission process, it is possible to smoothly give an instruction related to the process. Further, basic screen image 7100 (see FIG. 12) and basic screen image 7300 (see FIG. 16) are in such a state that allows only partial confirmation of preview images 3106 and 3306. Therefore, even when a different user executes a process next, possibility of leakage of confidential information is low.

In the embodiment above, after the scan-in process, when preview image 3106 or 3306 is touched, the display of the group of virtual ten keys 3102 or 3302 ends (steps S1103 and S1104 or steps S2103 and S2104). The present invention, however, is not limited to such an embodiment.

By way of example, it may be possible to automatically end the display of the group of virtual ten keys 3102 or 3302 if a predetermined, prescribed time period (for example, 3 seconds) passes without a touch operation or any other operation on the group of virtual ten keys 3102 or 3302. Here, in the copy mode, ten-key icon 3108 is automatically displayed. In the FAX mode, number display area 1304 is displayed. If the user does not wish to input the number of copies or the FAX number, the display of the group of virtual ten keys 3102 or 3302 automatically ends and, therefore, it becomes easier for the user to confirm the contents of preview image 3106 or 3306. As a result, user convenience can be improved.

Alternatively, when a portion other than the group of virtual ten keys 3102 or 3302 on basic screen image 7100 or 7300 is touched, display of the group of ten keys 3102 or 3302 may end. The display of the group of virtual ten keys 3102 may end when "close" key 3101 on background area 3103 is touched. In that case, if a numerical value is input by a touch operation of the group of virtual ten keys 3102 or 3302, it is preferable to have the input numerical value reflected on the number of copies (or the FAX number) in synchronization with the end of display of the group of virtual ten keys 3102 or 3302.

Figure 19:
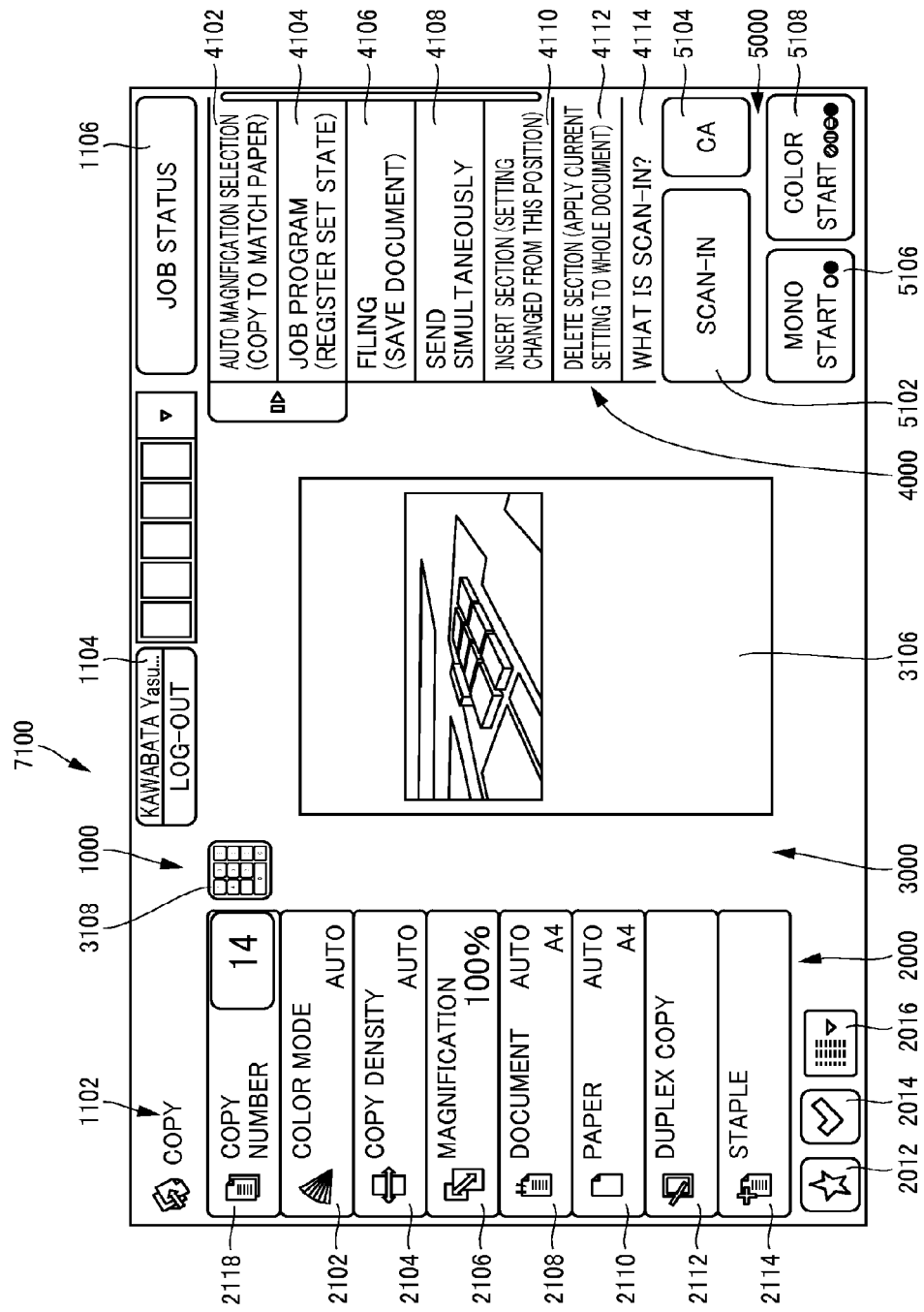
FIG. 19 shows an example of the copy mode basic screen image where a setting key displayed on a function selection area is used as the request key.

In the embodiment above, as a request key requesting display of the group of virtual ten keys 3102, ten-key icon 3108 is used on screen image 7100. The present invention, however, is not limited to such an embodiment. By way of example, as shown in FIG. 19, as the request key, a setting key displayed on area 2000 of screen image 7100 may be used. Referring to FIG. 19, in area 2000, at a position where area 2116 was provided in the embodiment above, a setting key 2118 for requesting display of the group of virtual ten keys 3102 is provided. On setting key 2118, a character string of "copy number" and a numerical value indicating the number of copies are displayed. If the user touches setting key 2118, the group of virtual ten keys 3102 is displayed on preview area 3000. Here, in order to facilitate understanding of the function of setting key 2118, it is preferred to display ten-key icon 3108 (that does not function as the request key) in the vicinity of key 2118.

Figure 20:
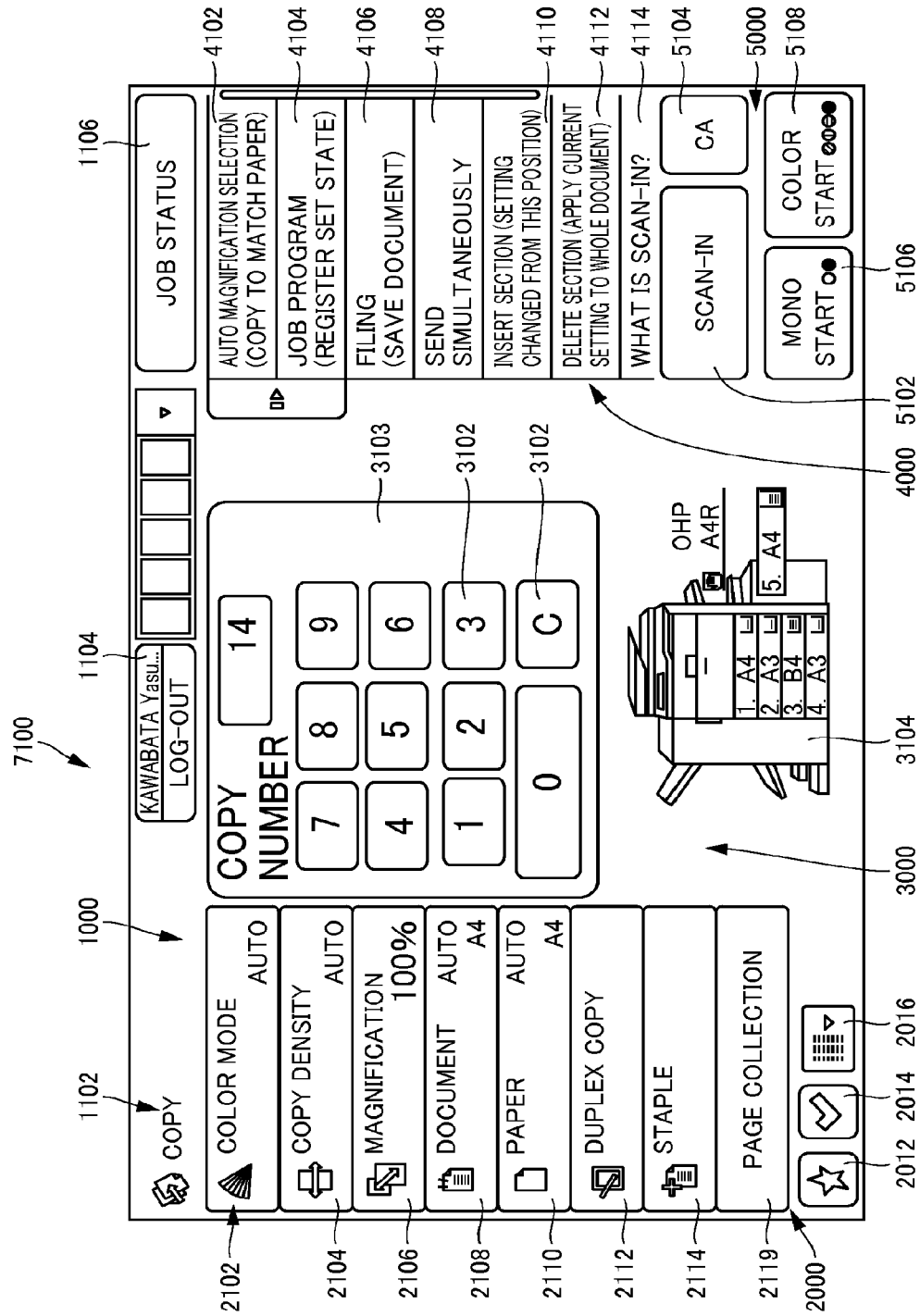
FIG. 20 shows an example of the copy mode basic screen image as the initial screen image.

If setting key 2118 functions as the request key as shown in FIG. 19, it is preferred that screen image 7100 shown in FIG. 20 is used as the initial screen image. Referring to FIG. 20, on screen image 7100 displayed as the initial screen image, at an upper portion of background area 3103 displayed on preview area 3000, the character string of "copy number" and the numerical value indicating the number of copies are displayed. Here, on background area 3103, "close" key 3101 is not displayed. Further, on area 2000, a key 2119 for setting the page collection function is displayed together with various setting keys 2102 to 2114.

When the scan-in process is executed with the initial screen image shown in FIG. 20 being displayed, preview image 3106 is displayed and setting key 2118 is displayed in place of the group of virtual ten keys 3102, as shown in FIG. 19. Here, since setting key 2118 is inserted above various setting keys 2102 to 2114, setting key 2119 shown at the lowermost portion of various setting keys 2102 to 2114 will be moved downward and hidden.

Figure 21:
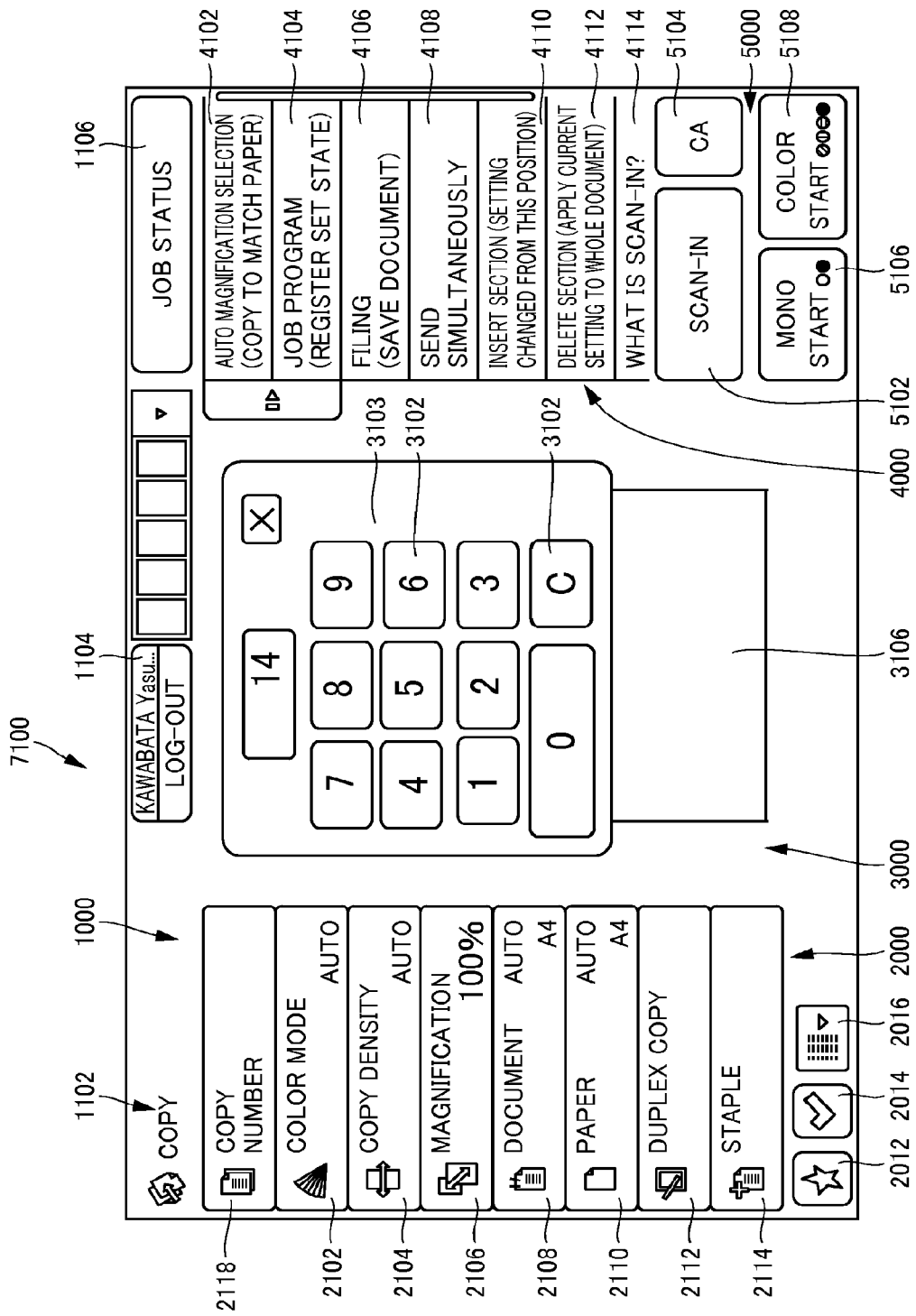
FIG. 21 shows a state of the copy mode basic screen image when the setting key as the request key shown in FIG. 19 is touched.

It is preferred that screen image 7100 shown in FIG. 21 is displayed when setting key 2118 shown in FIG. 19 is touched. Referring to FIG. 21, when setting key 2118 is touched, the group of virtual ten keys 3102 is displayed superposed on the front side of preview image 3106, and the character string "copy number" is displayed on setting key 2118. The numerical value indicating the number of copies is displayed at an upper portion of background area 3103. Here, setting key 2118 does not function as the request key.

Though the initial setting of numerical value indicating the number of copies is "0" in the embodiment above, the present invention is not limited to such an embodiment, and it may be "1". Here, the numerical value indicating the number of copies is always 1 or larger. Therefore, even if the numeric key "0" should be pressed on the group of virtual ten keys 3102 or 3302, the numerical value indicating the number of copies remains "1".

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console for use in an image processing apparatus, the image processing apparatus including a scanner and an image outputting device configured to output an image based on image data generated by the scanner, the operation console comprising:
    a touch-panel having a display screen;
    a ten-key display device configured to display a ten-key on the display screen while the operation console is capable of receiving an instruction to start scanning by the scanner, the ten-key being used to input a parameter to set up the image outputting device;
    a setting device configured to set up the image outputting device in accordance with the parameter;
    a scanning process device configured to execute a process for scanning a document by the scanner in response to an instruction to start scanning; and
    a preview image display device configured to display a preview image on the display screen based on the image data generated by the scanner, the preview image display device switching the display screen such that the preview image is displayed with a priority higher than the ten-key in response to the scanning process device executing the process for scanning while the ten-key is displayed on the display screen.

2. The operation console according to claim 1, wherein:
    the image outputting device includes an image forming device configured to form an image on an image-forming medium based on the image data; and
    the setting device includes a number setting device configured to set up a number of copies to be formed by the image forming device based on the image data generated by the scanner in accordance with the parameter inputted by the ten-key.

3. The operation console according to claim 1, further comprising:
    a parameter display device configured to display an area for displaying the parameter on the display screen when the preview image display device is displaying the preview image.

4. The operation console according to claim 3, wherein:
    the image outputting device includes an image forming device configured to form an image on an image-forming medium based on the image data; and
    the setting device includes a number setting device configured to set up a number of copies to be formed by the image forming device based on the image data generated by the scanner in accordance with the parameter inputted by the ten-key.

5. The operation console according to claim 3, further comprising:
    a ten-key re-display device configured to re-display the ten-key on the display screen with a priority higher than the preview image in response to a user touching the area for displaying the parameter.

6. The operation console according to claim 5, wherein:
    the image output device includes an image transmitting device configured to transmit the image data to a destination by telecommunication; and
    the ten-key display device includes a key display device configured to display at least one key for designating a destination of transmission of the image data by the image transmitting device.

7. The operation console according to claim 6, further comprising:
    a transmission starting device configured to start transmission of the image data to the destination designated by the at least one key using the image transmitting device in response to an instruction to start transmission of the image data.

8. The operation console according to claim 1, wherein:
    in response to the scanning process device starting to execute the process for scanning, the display screen is switched from the ten-key display device being displayed with a priority higher than the preview image to the preview image being displayed with a priority higher than the ten-key.

9. The operation console according to claim 1, wherein:
    in response to the scanning process device starting to execute the process for scanning, the ten-key display device is replaced with a ten-key icon displayed with a priority lower than the preview image.

10. The operation console according to claim 1, wherein:
    the ten-key display device continues to display the ten-key on the display screen after the preview image display device switches the display screen such that the preview image is displayed with the priority higher than the ten-key.

* * * * *